United States Patent
Li et al.

(10) Patent No.: US 12,326,526 B2
(45) Date of Patent: Jun. 10, 2025

(54) BALANCED PHOTODETECTOR AND METHODS THEREOF

(71) Applicant: Intel Corporation, Santa Clara, CA (US)

(72) Inventors: Zhi Li, San Jose, CA (US); Jonathan Doylend, Morgan Hill, CA (US); Gregory Lovell, Santa Clara, CA (US); Aliasghar Eftekhar, Fremont, CA (US); Srinivasan Sethuraman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 17/553,866

(22) Filed: Dec. 17, 2021

(65) Prior Publication Data
US 2022/0146650 A1    May 12, 2022

(51) Int. Cl.
*G01S 7/4914* (2020.01)
*G01S 7/497* (2006.01)

(52) U.S. Cl.
CPC ............ *G01S 7/497* (2013.01); *G01S 7/4914* (2013.01)

(58) Field of Classification Search
CPC ...... G01S 7/497; G01S 7/4914; G01S 7/4912; G01S 17/34; G01J 2001/444; G01J 1/44; G01J 1/4228
See application file for complete search history.

(56) References Cited

U.S. PATENT DOCUMENTS

| | | | | | |
|---|---|---|---|---|---|
| 5,343,160 | A | * | 8/1994 | Taylor | H03F 3/087 330/308 |
| 5,410,145 | A | * | 4/1995 | Coroy | H03F 3/087 257/E27.127 |
| 5,691,808 | A | * | 11/1997 | Nourrcier, Jr. | G01S 7/486 356/5.1 |
| 5,696,657 | A | * | 12/1997 | Nourrcier, Jr. | G01S 7/4861 361/115 |
| 2007/0230625 | A1 | | 10/2007 | Hironishi et al. | |
| 2011/0148522 | A1 | | 6/2011 | Tsai et al. | |
| 2017/0299429 | A1 | * | 10/2017 | Ahmed | H01L 31/02019 |
| 2019/0370614 | A1 | | 12/2019 | Crouch et al. | |
| 2020/0158839 | A1 | | 5/2020 | Lin et al. | |
| 2021/0239921 | A1 | | 8/2021 | Valdmanis et al. | |
| 2022/0146650 | A1 | | 5/2022 | Li et al. | |

OTHER PUBLICATIONS

International Search Report issued for the corresponding PCT patent application No. PCT/US2020/079361, dated Mar. 8, 2023, 4 pages (for informational purposes only).

\* cited by examiner

*Primary Examiner* — Jonathan M Hansen
(74) *Attorney, Agent, or Firm* — Viering, Jentschura & Partner mbB

(57) ABSTRACT

A balanced photodetector may include: a balanced photodetector including a first photodiode and a second photodiode coupled with one another at a common node, wherein the first photodiode has a first effective responsivity and the second photodiode has as second effective responsivity; and a control circuit configured to set an operating parameter of the balanced photodetector to compensate for a difference between the first effective responsivity and the second effective responsivity.

18 Claims, 7 Drawing Sheets

Setting one or more operating parameters of a balanced photodiode to compensate for a difference between a first effective responsivity of a first photodiode and a second effective responsivity of a second photodiode of the balanced photodiode

BALANCED PHOTODETECTOR AND METHODS THEREOF

CROSS-REFERENCE TO RELATED APPLICATIONS

This application is a continuation-in-part of U.S. application Ser. No. 17/469,935, which was filed on Sep. 9, 2021.

TECHNICAL FIELD

This disclosure relates generally to a balanced photodetector, a balanced photodetector and methods thereof (e.g., a method of operating a balanced photodetector).

BACKGROUND

Balanced photodetection is a sensing technique based on the differential combination of two or more light signals having undergone different propagation paths. The differential combination ensures that differences between the two or more light signals are highlighted, whereas any noise common to the two or more light signals (e.g., noise associated with a common light source) gets cancelled out. Balanced photodetection provides thus enhancing the resulting signal associated with the different propagation conditions that the light signals encounter along the respective propagation path, while reducing or eliminating any noise common to the light signals, thus providing a high signal-to-noise ratio (SNR). Balanced photodetection may thus be for use in a variety of applications in which small signal fluctuations between the light signals may provide information about a target of interest (e.g., a biological sample placed along one of the propagation paths, as an example).

BRIEF DESCRIPTION OF THE DRAWINGS

Throughout the drawings, like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1A:
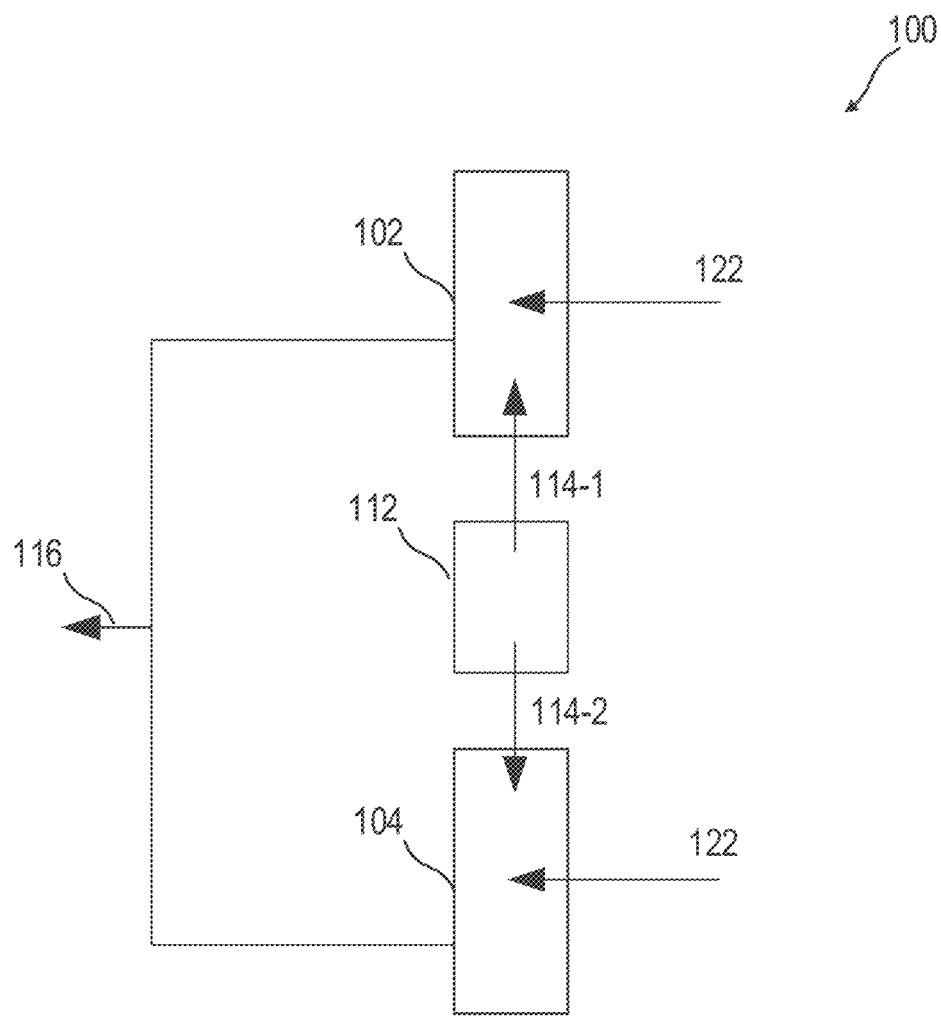
FIG. 1A exemplarily shows a balanced photodetector in a schematic view.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects described herein are not necessarily mutually exclusive, as some aspects can be combined with one or more other aspects to form new aspects. Various aspects are described in connection with methods (e.g., a method of operating a balanced photodetector) and various aspects are described in connection with devices (e.g., a balanced photodetector, a balanced photodetector, a photonic integrated circuit (PIC) and a light detection and ranging (LIDAR) system).

However, it may be understood that aspects described in connection with methods may similarly apply to the devices, and vice versa. Throughout the drawings, it should be noted that like reference numbers are used to depict the same or similar elements, features, and structures.

A balanced photodetector may be understood as a detection device configured to provide a differential measurement between two or more light signals. A balanced photodetector may include two photodiodes connected with one another in such a way that the respective photocurrents may be combined in a differential manner (see also FIG. 1A and FIG. 1B). One photodiode may be configured to receive one of the light signals, and the other photodiode may be configured to receive another one of the light signals. The balanced photodetector may be configured to combine (e.g., to amplify) differentially the photocurrents associated with the two light signals to provide an electrical signal associated with the difference between the photocurrents. The differential combination (e.g., the differential amplification) may provide amplifying the differences between the light signals while rejecting the common part of the light signals (e.g., the common noise), thus providing a measurement with high SNR. A figure of merit of a balanced photodetector is the so-called Common Mode Rejection Ratio (CMRR), which represents the ability of the balanced photodetector to cancel out the common (noise) part of the light signals, as described in further detail below. A balanced photodetector may also be referred to herein as balanced photoreceiver or balanced detector.

A balanced photodetector may be for use in various fields of application, such as frequency modulation spectroscopy, light scattering spectroscopy, femtosecond ultrasonics, optical coherence tomography, infrared gas sensors, homodyne detection, and coherent optical code-division multiple-access (CDMA), as examples. One of the light signals at the balanced photodetector may provide a reference signal, and the other light signal may carry information on a target of interest in form of differences with the reference signal (e.g., differences in phase, optical power, and/or the like). The variation in the optical properties of the light signal encountering the target along its optical path with respect to the reference signal may provide determining one or more properties of the target. A particular field of use for a balanced photodetector may be for light detection and ranging (LIDAR) applications, as described in further detail below. A balanced photodetector with balanced photodiodes might be used in components for optical communication systems, LIDAR illumination and sensing, robotics, assisted and autonomous driving, autonomous vehicles, robotaxis, drones, airplanes and airtaxis. The LIDAR system may be used as a component in an autonomous vehicle, autonomous robot, or autonomous UAV or drone, to sense objects, internally as well as externally. The LIDAR system may also be used for assistance systems in vehicles, robots, UAVs or drones. The LIDAR system may be part of a multimodal sensing system, operating alongside or in combination with cameras, radar, ultrasound, or mm-wave ultra-wideband (UWB). Navigation and autonomous or assisted decision-making may be based wholly or in part on the LIDAR system. In addition, the LIDAR system may be used in mobile devices such as smartphones, tablets or laptops for purposes including environment, object, person, posture detection or gesture detection.

In a balanced photodetector it may occur that due to non-idealities the common part of the light signals (e.g., the radiofrequency, RF, component of the photocurrent) is not cancelled out, thus causing a degradation of the CMRR. The degradation (e.g., the reduction) of the CMRR may be related, for example, to a difference in the responsivities of the photodiodes and/or to an imbalance in the optical paths associated with the photodiodes (e.g., different optical losses along the optical paths to the photodiodes). A conventional approach to compensate for the non-idealities may include using a tunable inline optical attenuator and/or a tunable inline optical amplifier to optically manipulate the light signals prior to these impinging onto the photodiodes. Illustratively, the light signals may be attenuated or amplified to compensate for optical losses along the respective paths or for differences in the responsivity of the photodiodes. However, an inline optical attenuator or amplifier occupies additional space (e.g., additional chip space considering a chip-based photodetector) and requires a rather complex control method.

The present disclosure is related to a balanced photodetector configured to provide a tunable operation to compensate for a possible degradation of the CMRR in a simpler manner with respect to a conventional approach, e.g. without relying on cumbersome inline optical attenuators or amplifiers. The balanced photodetector described herein may thus provide detection with a high CMRR (and a high SNR), while allowing an efficient utilization of chip space and a simple control strategy.

The present disclosure may be based on the realization that the responsivity of a photodiode may vary as a function of one or more operating parameters, such as bias voltage and/or temperature, and that such dependency of the responsivity may enable an adaptive control strategy for reducing or eliminating possible imbalances affecting the photodiodes in a balanced photodetector. A tuning of the one or more operating parameters allows therefore to control (e.g., to adjust) the responsivities of the photodiodes of a balanced photodetector to compensate for possible non-idealities. The balanced photodetector described herein may thus be configured to tune one or more of the operating parameters to vary the respective responsivities of the photodiodes in such a way that the variation compensates the effect of non-idealities of the photodetector, e.g. such that the variation compensates a difference in the responsivity and/or an optical imbalance in the optical paths. Illustratively, the strategy described herein may be based on adjusting the responsivity of the photodiodes by suitably tuning one or more operating parameters rather than relying on an attenuation or amplification of the light delivered to the photodiode.

The balanced photodetector described herein may be configured to implement an adaptive operation in which one or more operating parameters are tuned (e.g., selected) to adjust the responsivities of the photodiodes in such a way that the photodiodes experience a same condition for detecting the incoming light (e.g., in such a way that a combination of responsivity and optical loss is same for both photodiodes). Illustratively, the balanced photodetector may be configured to implement an active CMRR control, which provides improving (e.g., increasing) the CMRR to compensate CMRR degradation that may be induced by process variations. For LIDAR applications, the CMRR compensation may enable sensitive detection in long range LIDAR systems.

A balanced photodetector may include: a balanced photodetector including a first photodiode and a second photodiode coupled with one another at a common node, wherein the first photodiode has a first effective responsivity and the second photodiode has as second effective responsivity; and a control circuit configured to set an operating parameter of the balanced photodetector to compensate for a difference between the first effective responsivity and the second effective responsivity.

A balanced photodetector may include: a balanced photodetector including a first photodiode having a first effective responsivity and a second photodiode having a second effective responsivity, wherein the first effective responsivity and the second effective responsivity have an initial difference between one another; and a control circuit configured to set an operating parameter of the balanced photodetector to induce a first effective responsivity change in the first effective responsivity and/or a second effective responsivity change in the second effective responsivity, such that an operating difference between the first effective responsivity and the second effective responsivity is less than the initial difference between the first effective responsivity and the second effective responsivity.

A method of operating a balanced photodetector may be provided, the balanced photodetector including a balanced photodetector with a first photodiode and a second photodiode, wherein the first photodiode has a first effective responsivity and the second photodiode has a second effective responsivity, the method including: setting an operating parameter of the balanced photodetector to compensate for a difference between the first effective responsivity and the second effective responsivity.

A method of increasing a common mode rejection ratio of a balanced photodetector may be provided, the method including: setting a first operating parameter of a first photodiode of the balanced photodetector to induce a first effective responsivity change in a first effective responsivity of the first photodiode; and/or setting a second operating parameter of a second photodiode of the balanced photodetector to induce a second effective responsivity change in a second effective responsivity of the second photodiode, wherein the first effective responsivity change and the second effective responsivity change are selected to compensate for an initial difference between the first effective responsivity and the second effective responsivity.

A method of operating a balanced photodetector may be provided, the balanced photodetector including a balanced photodetector with a first photodiode and a second photodiode, the method including: setting an operating parameter of the balanced photodetector to provide a same effective responsivity for the first photodiode and the second photodiode.

Illustratively, a method utilizing a responsivity vs bias behavior and/or a responsivity vs temperature behavior may provide active CMRR tuning for a balanced photodetector. Designing the epitaxial structure of the photodiode may provide a negatively sloped responsivity curve vs bias, and a positively sloped responsivity curve vs temperature curve. Using a push-pull bias supply for the balanced photodetector and/or localized metal heater may provide simultaneously control of the responsivity of the photodiodes of a balanced photodetector. This active CMRR control method improves CMRR to compensate process variation induced CMRR degradation. The improved CMRR may provide sensitive detection in a long range LIDAR system. In other words, the methods provide active tunability of the PDs of a balanced photodetector internal responsivity. This way, improved CMRR can be achieved to strengthen LIDAR performance using one of, or both of, these methods to balance the photodiodes responsivity.

The term "responsivity" may be used herein to describe the relationship between the input and the output of a detection device, as known in the art. In relation to a photodiode, the responsivity of the photodiode may represent the photocurrent per incident unit optical power, e.g. the responsivity may be described as a ratio of the photocurrent to incident light power at a given wavelength. The responsivity of a photodiode may also be referred to herein as "intrinsic responsivity" (illustratively, without taking into consideration effects external to the photodiode, e.g. optical losses).

The term "effective responsivity" may be used herein to describe the overall response to an incoming signal associated with a detection device, e.g. the overall response to incident light associated with a photodiode. The "effective responsivity" may include the effect(s) that may influence the response of the detection device, e.g. the effects that may influence the photocurrent that the photodiode generates in response to the incoming light. As used herein, the term "effective responsivity" may be understood as a response function associated with a photodiode, which represents the relevant effects to determine the relationship between the output and the input of the photodiode. In the following, the "effective responsivity" of a photodiode may include the intrinsic responsivity of the photodiode and an optical loss associated with the photodiode. The optical loss associated with a photodiode may include one or more optical losses of one or more optical components that deliver the light to the photodiode (e.g., a waveguide, an interferometer, etc.), e.g. one or more optical components of a balanced photodetector or of a balanced photodetector. Such representation of the "effective responsivity" may provide an efficient characterization of the quantities that may degrade the CMRR in a balanced photodetector. It is however understood that the "effective responsivity" may also include additional or alternative quantities to represent the effective response of a photodiode, e.g. in general the "effective responsivity" of a photodiode may include the intrinsic responsivity of the photodiode and one or more additional parameters associated with the response of the photodiode to incoming light. A photodiode having an "effective responsivity" (or having an effective responsivity associated therewith) may be understood as the photodiode being associated with a response function describing an overall relationship between the incoming light and the photocurrent that the photodiode generates. An "effective responsivity" of a photodiode may also be referred to herein as "effective response", "actual response", or "(effective) response function" of the photodiode. Two photodiodes having different effective responsivities may experience different optical loss and/or may have different intrinsic responsivity (e.g., same intrinsic responsivity and different optical loss, or same optical loss and different intrinsic responsivity, or different optical loss and different intrinsic responsivity). Illustratively, the term "effective" may be used herein to distinguish an overall response of a photodiode to incoming light (e.g., taking into account multiple effects, which may be internal or external to the photodiode) from the intrinsic responsivity of the photodiode.

The term "operating parameter" may be used herein to describe a parameter that may be set to bring a device (e.g., a balanced photodetector, a balanced photodetector) in a predefined operating condition. An "operating parameter" may be understood as a parameter that may be associated with the process condition(s) in which the device operates. In the context of the present disclosure, in relation to a photodiode, an "operating parameter" may include a parameter that in addition to providing an operating condition of the photodiode also has an influence on the responsivity of the photodiode. In the present disclosure, an operating parameter of a photodiode may describe a parameter that may be set to enable a predefined operation of the photodiode and to induce a predefined change in the responsivity (and consequently in the effective responsivity). In the following, particular reference may be made to a bias voltage and a temperature as operating parameter(s) that may be set to induce a predefined change in the responsivity of a photodiode. The bias voltage and the temperature may allow for a simple tuning of the intrinsic (and effective) responsivity of the photodiode to compensate for a degradation of the CMRR. It is however understood that the bias voltage and the temperature are only examples of possible operating parameters that may be tuned to implement the adaptive strategy described herein, and also other operating parameters may be set to induce the predefined change in the responsivity of the photodiode. An operating parameter may also be referred to herein as operational parameter.

In the context of the present disclosure, the operation of a balanced photodetector configured to provide the adaptive tuning of the responsivity may be illustrated with particular reference to LIDAR applications, e.g. with particular reference to a LIDAR system including the balanced photodetector. In LIDAR applications, the balanced photodetector described herein may provide coherent light detection with high SNR, and thus an increased detection range for the LIDAR system. It is however understood that the applications of a balanced photodetector configured as described herein are not limited to its use in a LIDAR system, and the balanced photodetector may be for use also for other types of techniques, as mentioned above.

A LIDAR system may be understood as a device configured to implement LIDAR sensing, and may include various components to carry out light emission, light detection, and data processing. A LIDAR system may include a light source (e.g., a laser source) and emitter optics to direct light into a field of view (FOV) of the LIDAR system, and may include receiver optics and a receiver (a detector) to collect and detect light from the field of view. The LIDAR system may further include a processing circuit configured to determine spatial information associated with the field of view of the LIDAR system based on the emitted and received light (e.g., the processing circuit may be configured to determine various properties of an object in the field of view based on the light that the LIDAR system emits and that the object reflects back towards the LIDAR system). Additionally or alternatively, the LIDAR system may be communicatively coupled with a processing circuit external to the LIDAR system, e.g. with a cloud-based processing circuit. As examples, the processing circuit may be configured to determine the distance of an object from the LIDAR system, the shape of the object, the dimensions of the object, and/or the like. The LIDAR system may further include one or more additional components to enhance or assist the LIDAR sensing, such as, only as examples, a gyroscope, an accelerometer, a Global Positioning System (GPS) device, and/or the like. A LIDAR system may also be referred to herein as LIDAR device, LIDAR module, or LIDAR apparatus.

FIG. 1A illustrates a schematic diagram of a balanced photodetector 100. The general structure of a balanced photodetector may be known in the art; a brief description is provided herein to illustrate the aspects relevant to the present disclosure. The balanced photodetector 100 may include a first photodiode 102 and a second photodiode 104 that receive light 122 from the outside, e.g. from a target of the LIDAR system, and/or directly from a light source, e.g. a local oscillator (LO) of the LIDAR system, and provide a common output signal 116. The common output signal 116 includes the information about the target, e.g. a distance to the target, and/or of the light source of the LIDAR system.

Figure 2A:
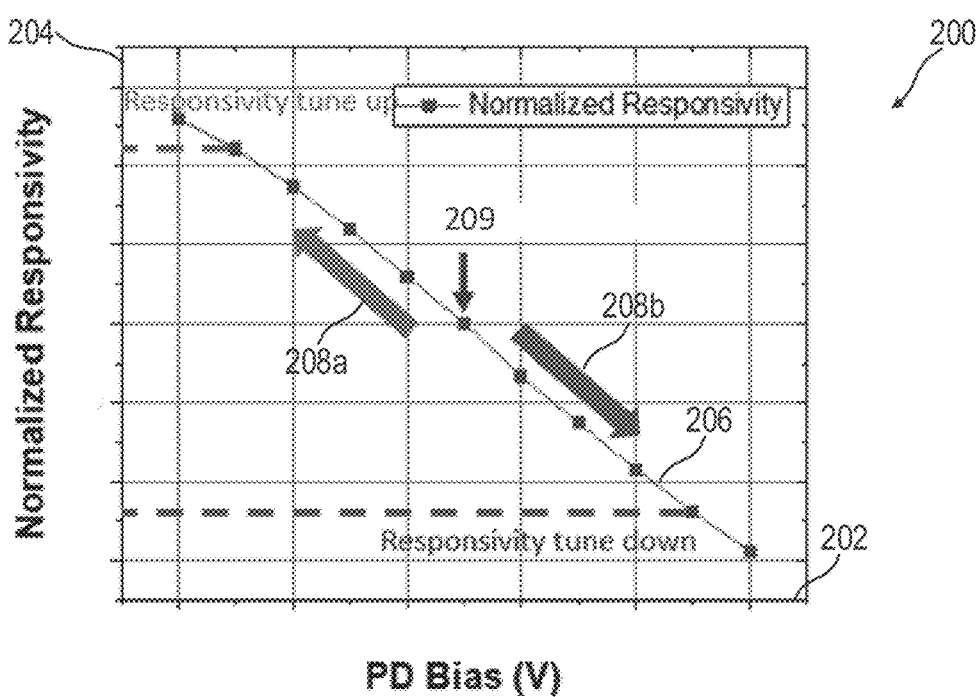
FIG. 2A exemplarily shows a graph illustrating the relationship between bias voltage and responsivity of a photodiode.
Figure 2B:
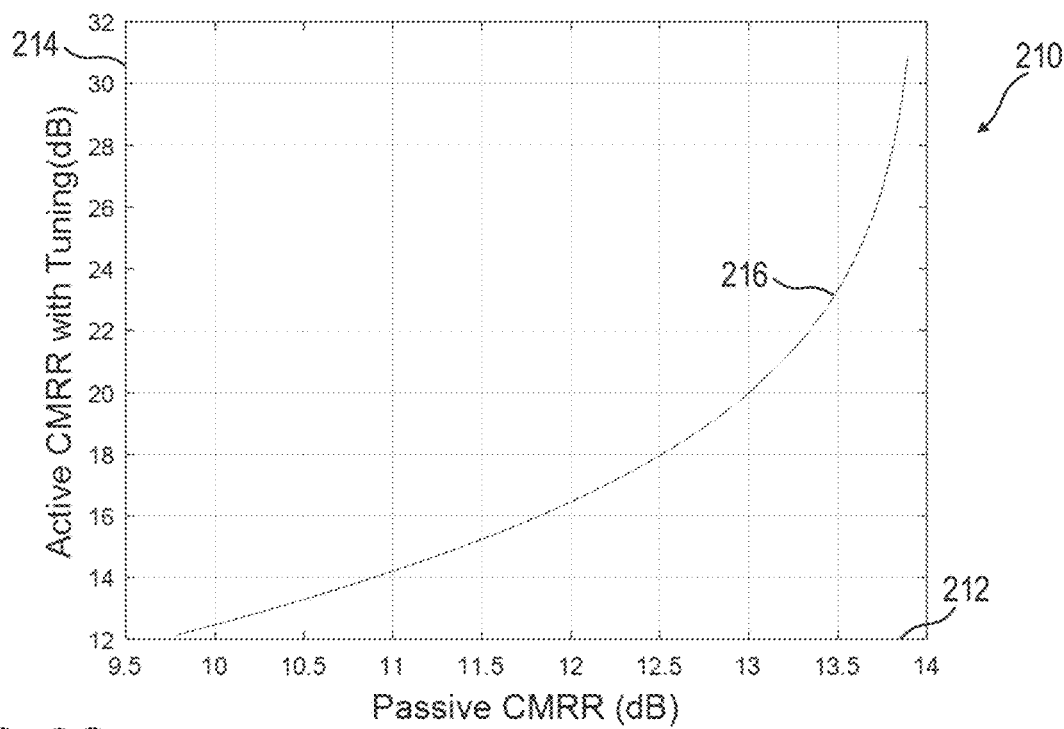
FIG. 2B exemplarily shows a graph illustrating the common mode rejection ratio of a balanced photodetector before and after active tuning.
Figure 2C:
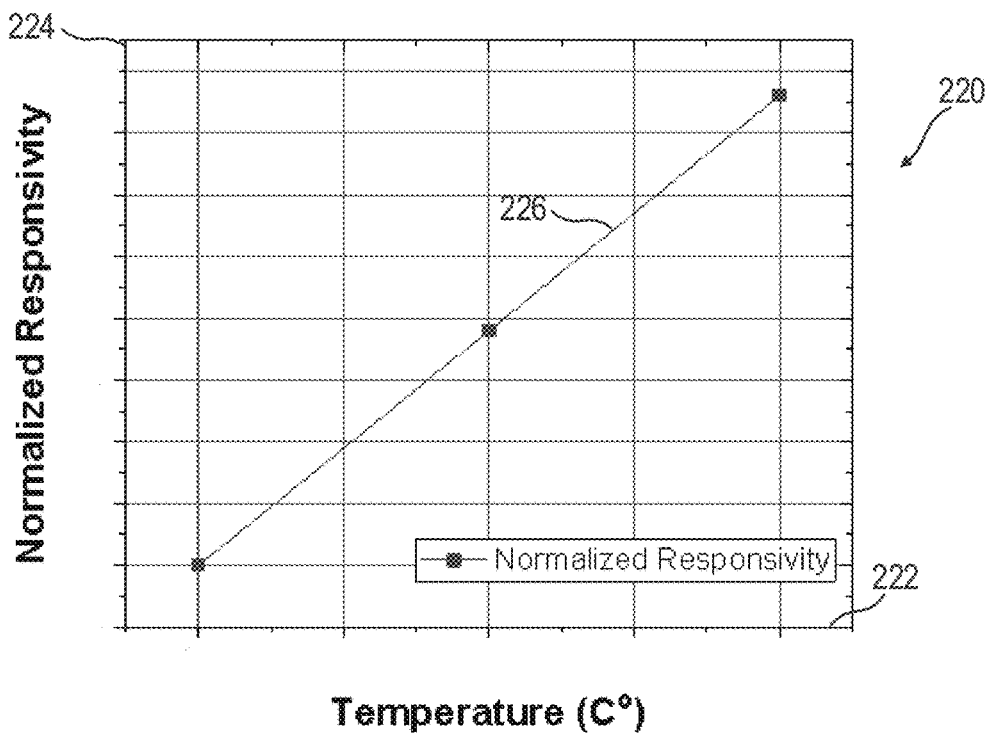
FIG. 2C exemplarily shows a graph illustrating the relationship between temperature and responsivity of a photodiode.

The photodiodes 102, 104 may be specifically configured to have a linear relation between the responsivity and bias voltage and/or between responsivity and temperature, as an example as illustrated in FIG. 2A and FIG. 2C.

The balanced photodetector 100 may further include a control circuit 112. The control circuit 112 may be configured to adjust the responsivity of the first photodiode 102 and to adjust the responsivity of the second photodiode 104 (in FIG. 1A illustrated with the arrow 114-1 and 114-2). In other words, the control circuit 112 may be configured to set an operating parameter of the balanced photodetector to compensate for a difference between the first effective responsivity of the first photodiode 102 and the second effective responsivity of the second photodiode 104. Here, illustratively, the responsivity of a photodiode 102, 104 may be the input-output gain associated with the electrical output signal 116 per optical input 122. The control circuit 112 may be configured adjust the responsivity of the photodiodes 102, 104 independently from each other. As a numerical example, the control circuit 112 may be configured to increase the responsivity of the first photodiode 102 by 2% and decrease the responsivity of the second photodiode 104 by 4%.

The control circuit 112 may adjust the responsivity of the first photodiode 102 and the second photodiode 104 to set a predetermined CMRR of the photodetector 100, e.g. to reduce an imbalance between the signals of the photodiodes 102, 104.

The balanced photodetector 100 may be integrated with a photonic integrated circuit (PIC) in a package or module, e.g. system in package (SIP) or system on module (SOM).

The balanced photodetector 100 may be formed or integrated in a semiconductor photonic substrate. The semiconductor photonic substrate may be made of a semiconductor material, e.g. silicon. The term "integrated therein" may be understood as formed from the material of the substrate and, thus, may be different to the case in which elements are formed, arranged or positioned on top of a substrate.

The balanced photodetector 100 may be configured to detect a coherent electromagnetic radiation of one or more wavelength. Through this specification any kind of usable of "electromagnetic radiation" is denoted as "light" for illustration purpose only and even though the electromagnetic radiation may be in the frequency range of visible light, infrared light/radiation, ultraviolet light/radiation, a terahertz spectrum and/or a microwave spectrum. The electromagnetic radiation may include a continuous wave and/or pulsed, e.g. a frequency modulated continuous wave (FMCW) in which the frequency of the received light is swept or chirped. The balanced photodetector 100 may be configured may be configured to determine electromagnetic radiation of different frequencies, e.g. at the same time or subsequently.

In other words, a PIC may include a semiconductor substrate having integrated one or more optical channels each configured to emit coherent light to an outside and to receive coherent light 122 from the outside. Each of the optical channels may include a balanced photodetector that may include at least a first photodiode 102, a second photodiode 104, and a control circuit 112. The control circuit 112 may be configured to adjust 114-1, 114-2 the responsivity of the first photodiode 102 and to adjust the responsivity of the second photodiode 104. The balanced photodetector 100 may be configured to provide a common output signal 116 based on the coherent lights 122 from the outside received at the first photodiode 102 and the second photodiode 104. The light 122 from the outside may have about the same properties for the first photodiode 102 and the second photodiode 104. The control circuit 112 may be configured to reduce an imbalance of the responsivities of the first photodiode 102 and the second photodiode 104.

The control circuit 112 may include a heater configured to adjust a temperature of at least one of the first photodiode 102 or second photodiode 104. As an example, the control circuit 112 may include at least a first heater and a second heater, wherein at least one photodiode of the first photodiode 102 and the second photodiode 104 may be arranged between the first heater and the second heater. As an example, at least one heater may be spatially arranged between the first photodiode 102 and the second photodiode 104. As an example, the heater may be equidistant to the first photodiode 102 and to the second photodiode 104.

Alternatively, or in addition, the control circuit 112 may include a voltage supply configured to adjust a bias voltage at at least one electrode of the first photodiode 102 or second photodiode 104. As an example, the control circuit may include a direct current bias voltage source. As an example, each of the first photodiode 102 and the second photodiode 104 may include an anode and a cathode, e.g. each of the first photodiode 102 and the second photodiode 104 may include an anode and a cathode, and the first photodiode 102 and the second photodiode 104 are electrically in series. The control circuit 112 may be coupled to a node arranged between and coupled to the first photodiode 102 and the second photodiode 104. The first photodiode 102 may be coupled to a first voltage source and the second photodiode 104 may be coupled to a second voltage source. The control circuit 112 may provide a bias voltage between a voltage of the first voltage source and a voltage of the second voltage source. The bias voltage may be associated with an imbalance between the first photodiode 102 and the second photodiode 104. The control circuit 112 may be configured to determine the common output signal 116.

The balanced photodetector 100 of different light channels of a LIDAR system may be optically isolated from each other and/or may be addressable independently from each other. In other words, the balanced photodetectors 100 of different optical channels may be configured to detect light from the outside 122 of the PIC independently from each other.

Figure 1B:
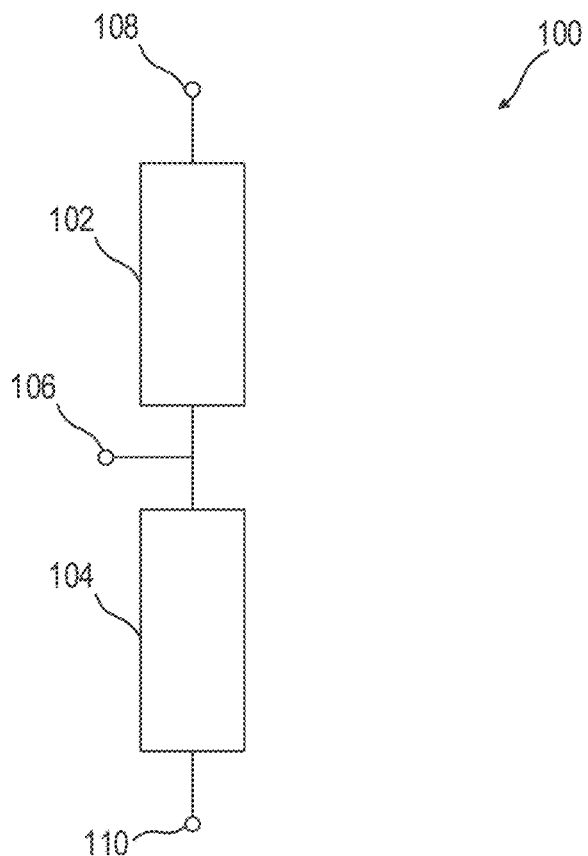
FIG. 1B exemplarily shows a balanced photodetector in a schematic view.

FIG. 1B exemplarily shows a balanced photodetector 100 in a schematic view. The pair of photodiodes 102, 104 of the balanced photodetector 100 may be coupled with one another in such a way that the respective photocurrents of the photodiodes 102, 104 may be combined (e.g., differentially). As illustrated in FIG. 1B, the first photodiode 102 and the second photodiode 104 may be coupled with one another at a common node 106 (also referred to herein as common terminal or common electrode). The photodiodes 102, 104 may be sensitive to light, e.g. may be configured to provide (e.g., to generate) a photocurrent in response to light (e.g., a light signal) impinging onto the photodiodes 102, 104. As an example, the photodiodes 102, 104 may be sensitive to light in a predefined wavelength range, in accordance with an application of the balanced photodetector 100. As a numerical example, e.g. considering LIDAR applications, the first photodiode 102 and the second photodiode 104 may be sensitive to light having a wavelength in the infrared or near-infrared wavelength range, e.g., in the range from about 700 nm to about 5000 nm, for example in the range from about 900 nm to about 2000 nm, for example at 905 nm or 1550 nm.

The first photodiode 102 and the second photodiode 104 may be connected in series with one another. The connection at the common node 106 may provide that a first photocurrent associated with the first photodiode 102 (illustratively the photocurrent that the first photodiode 102 may generate upon light impinging onto the first photodiode 102) and a second photocurrent associated with the second photodiode 104 (illustratively the photocurrent that the second photodiode 104 may generate upon light impinging onto the second photodiode 104) flow to the common node 106. Illustratively, upon simultaneous illumination of the photodiodes 102, 104 the current at the common node 106 may be $I_1-I_2$, with $I_1$ being the first photocurrent associated with the first photodiode 102 and $I_2$ being the second photocurrent associated with the second photodiode 104. The first photocurrent and the second photocurrent may combine differentially with one another at the common node 106, so that common noise present in the first photocurrent and the second photocurrent gets cancelled out.

The balanced photodetector 100 may be configured to allow a biasing of the photodiodes 102, 104. The first photodiode 102 may be coupled between a first supply node 108 (also referred to herein as first supply terminal) and the common node 106, and the second photodiode 104 may be coupled between the common node 106 and a second supply node 110 (also referred to herein as second supply terminal). The balanced photodetector 100 may be configured to receive a first supply voltage at the first supply node 108 and a second supply voltage at the second supply node 110 (e.g., the first supply node 108 may be connectable with a first voltage source, and the second supply node 110 may be connectable with a second voltage source). The biasing of the photodiodes 102, 104 (e.g., the voltages at the supply nodes 108, 110) may be set in accordance with the configuration of the photodiodes 102, 104 and with the operation of the balanced photodetector 100, as described in further detail below. The biasing of the photodiodes 102, 104 may enable the generation of photocurrent in the photodiodes 102, 104 upon light impinging thereon (illustratively, may bring the photodiodes 102, 104 in a suitable operating region).

The photodiodes 102, 104 may be connected with the supply nodes 108, 110 and with the common node 106 in such a way that upon biasing of the photodiodes 102, 104 the respective photocurrents flow towards the common node 106. As an exemplary configuration (see also FIG. 4A), the photodiodes 102, 104 may be configured as p-n photodiodes, PIN photodiodes, or avalanche photodiodes (APD). For example, the first photodiode 102 may include a (first) cathode coupled with the first supply node 108 and a (first) anode coupled with the common node 106, and the second photodiode 104 may include a (second) cathode coupled with the common node 106 and a (second) anode coupled with the second supply node 110. It is however understood that also other configurations (e.g., an inverse arrangement of cathodes and anodes) may be provided.

The photodiodes 102, 104 may have a configuration (e.g., a structure) that allows adapting the responsivity of the photodiodes 102, 104 as a function of one or more operating parameters of the balanced photodetector 100. Illustratively, the photodiodes 102, 104 may have a structure that allows for a control over the responsivity of the photodiodes 102, 104 by varying one or more operating parameters of the balanced photodetector 100. As an exemplary configuration, the photodiodes 102, 104 (e.g., at least one of the first photodiode 102 and/or the second photodiode 104) may include an epi-engineered structure. Illustratively, the photodiodes 102, 104 may include one or more layers epitaxially grown on a substrate (e.g., a semiconductor substrate, such as a silicon wafer). As an example, the photodiodes 102, 104 (e.g., at least one of the first photodiode 102 and/or the second photodiode 104) may include an epi-engineered III-V photodiode, illustratively with one or more layers of III-V materials epitaxially grown on a substrate. It is however understood that an epi-engineered structure (e.g., with III-V layers) is only an example and that the photodiodes 102, 104 may also include a different type of structure or different types of materials that allow the tuning of the responsivity as described herein.

As an example, the photodiodes 102, 104 may be integrated in the semiconductor photonic substrate, a hybrid silicon photodiode or a germanium photodiode. The photodiode may have a specific epitaxial structure, e.g. a dopant-concentration profile, to provide a linear responsivity behavior, e.g. as illustrated in FIG. 2A and FIG. 2C. However, the photodiodes 102, 104 may also have a non-linear relation between responsivity and bias voltage, temperature, or any other externally controllable characteristic of the photodiode 102, 104, e.g. operating parameter.

Compared to deploying two individual photodiodes, a balanced photodetector provides suppressing the intensity noise common to the light signals received at the photodiodes (e.g., the noise from a laser source, which is a common input for both photodiodes, e.g. the photodiodes 102, 104). The figure of merit to describe a balanced photodetectors performance to suppress such common mode signal is the Common Mode Rejection Ratio (CMRR), as mentioned above. The CMRR may be expressed in decibel (dB). One form of its mathematical expression is provided in Equation (1) below, $$CMRR = -10\log\left|\frac{R_{EFF1} - R_{EFF2}}{\frac{(R_{EFF1} + R_{EFF2})}{2}}\right| \quad (1)$$

A high CMRR (for example, greater than 15 dB, or greater than 30 dB) may provide sensitive coherent detection. However due to process variations, "real world" CMRR may be low due to one or a combination of random defects, such as optical imbalance (e.g., multi-mode interferometer output imbalance, excessive loss in a waveguide, as examples) or responsivity imbalance at the photodiodes (e.g., at the photodiodes 102, 104).

In Equation (1), $R_{EFF1}$ and $R_{EFF2}$ represent the effective responsivities of the photodiodes. Illustratively, a first photodiode (e.g., the first photodiode 102) may have a first effective responsivity and a second photodiode (e.g., the second photodiode 104) may have a second effective responsivity. The effective responsivity $R_{EFF1}$, $R_{EFF2}$ represent a total response of the photodiodes to incoming light, including, for example, the intrinsic responsivity of the photodiodes and optical loss associated with the photodiodes. The optical loss may be related to optics (see for example FIG. 9) provided to direct the light towards the photodiodes. The optics may include one or more optical components (e.g., one or more lenses, mirrors, waveguides, and/or the like) of a balanced photodetector (e.g., of the balanced photodetector 100) and/or one or more optical components of a balanced photodetector including the balanced photodetector, as described in further detail below (as an example the optical loss may include optical loss of a multi-mode interferometer (MMI) and waveguide loss between the output of the multi-mode interferometer and the photodiodes). Illustratively, the first effective responsivity $R_{EFF1}$ may include the first (intrinsic) responsivity of the first photodiode and a first optical loss associated with the first photodiode, and the second effective responsivity $R_{EFF2}$ may include the second responsivity of the second photodiode and a second optical loss associated with the second photodiode. The CMRR may be understood as the CMRR of a balanced photodetector (e.g., of the balanced photodetector 100), or as the CMRR of a balanced photodetector including the balanced photodetector. It is understood that the effective responsivity $R_{EFF1}$, $R_{EFF2}$ may include additional or alternative quantities to describe the overall response of the photodiodes to incoming light (e.g., in addition or in alternative to the optical loss associated with the photodiodes the effective responsivity may include a light emission efficiency of a light source emitting the light that the photodiodes receive/detect, and/or one or more geometrical parameters of the photodiodes, as other examples).

Considering, for example, the effective responsivity as a combination of the intrinsic responsivity and the optical loss, the CMRR may be expressed as described in Equation (2) below, $$CMRR = -10\log\left|\frac{Loss_1 R_1 - Loss_2 R_2}{\frac{(Loss_1 R_1 + Loss_2 R_2)}{2}}\right| \quad (2)$$

Figure 5:
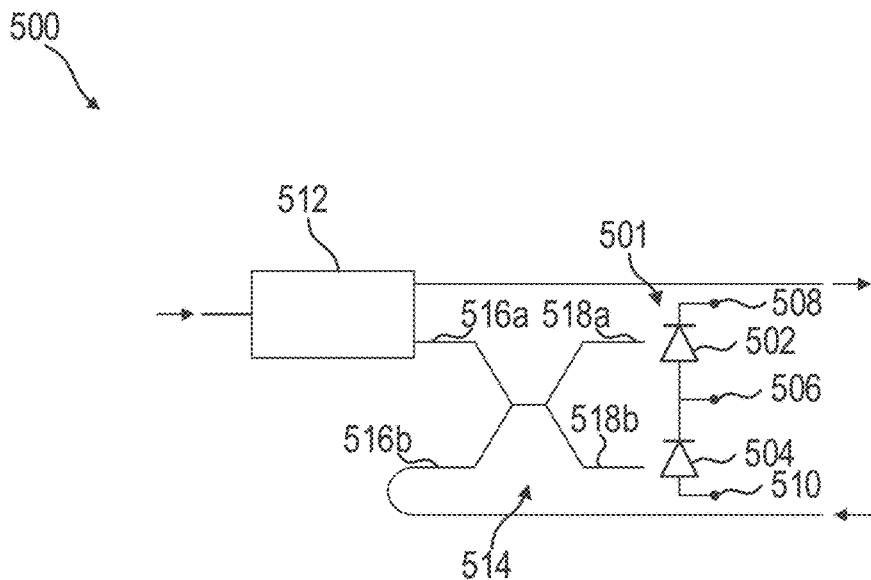
FIG. 5 exemplarily shows a LIDAR system including a balanced photodetector with a balanced photodetector in a schematic view.

In Equation (2), $R_1$ and $R_2$ represent the intrinsic responsivity of the photodiodes (e.g., of the first photodiode 102 and the second photodiode 104) under equal reverse bias, and $Loss_1$ and $Loss_2$ represent the optical loss associated with the photodiodes (e.g., optical loss between a MMI and the photodiodes as an exemplary scenario, see FIG. 5).

Equation (3) below describes the effective responsivity ratio, with the term "Imbalance" being between −1 and +∞, $$Ratio_{responsivity} = \frac{Loss_1 R_1}{Loss_2 R_2} = 1 + \text{Imbalance} \quad (3)$$

Combining Equation (2) and Equation (3) with one another provides Equation (4) below, which describes that the CMRR may be associated with (e.g., determined by) the amount of external responsivity imbalance between the two photodiodes (e.g., between the first photodiode 102 and the second photodiode 104).

$$CMRR = 10\log\left|\frac{1}{\text{Imbalance}} + 0.5\right| \quad (4)$$

The present disclosure may be related to a strategy for actively tuning the effective responsivity. The strategy described herein may be based on the realization that the responsivity of a photodiode (e.g., of the photodiodes 102, 104) may vary as a function of one or more operating parameters, so that a controlled variation of the responsivities may provide compensating possible defects and improving (e.g., increasing) the CMRR of a balanced photodetector. The present disclosure may be related to introducing a controlled change in the responsivity of the photodiodes of a balanced photodetector (e.g., in the responsivity of the first and second photodiodes 102, 104) to provide a tuned responsivity (also referred to herein as balanced responsivity) that may counteract the imbalance given by real world defects.

Figure 4A:
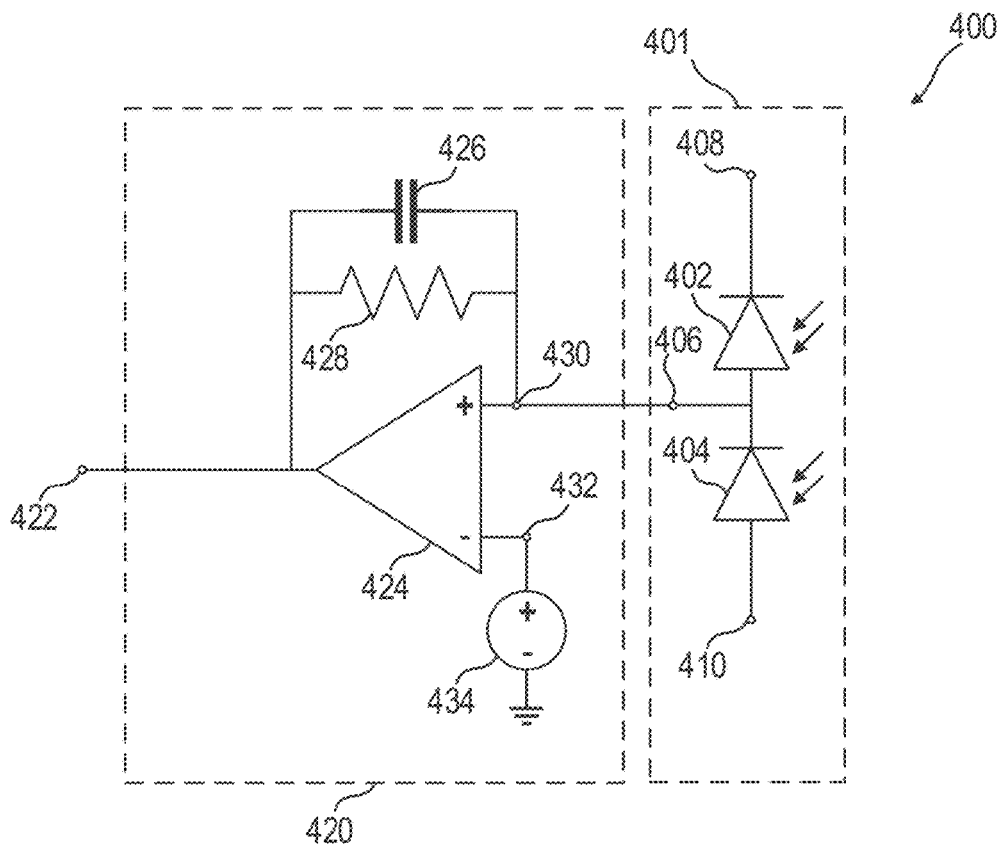
FIG. 4A and FIG. 4B each exemplarily shows an implementation of a balanced photodetector including a balanced photodetector in a schematic view.

Equation (5) describes that by varying one or more operating parameters of a balanced photodetector (e.g., a temperature, or a bias voltage, e.g. by applying bias shift for a regulating port, see FIG. 4A), one photodiode (e.g., the first photodiode 102) may have a percentage change of α in its responsivity, and the other photodiode (e.g., the second photodiode 104) may have approximately the same amount of change but in reverse direction (illustratively, with opposite sign), meaning it has percentage change of −α. Equation (5) describes the new effective responsivity ratio after the induced variation of the responsivities (e.g., after the bias shift is applied, and/or after the temperature varies, as examples), $$Ratio_{Responsivity} = \frac{Loss_1 R_1 \times (1 + \alpha)}{Loss_2 R_2 \times (1 - \alpha)} = (1 + \text{Imbalance}) \times \frac{1 + \alpha}{1 - \alpha} == \quad (5)$$
$$1 + \text{Imbalance} + (1 + \text{Imbalance}) \times \frac{2\alpha}{1 - \alpha}$$

Compared to Equation (3), Equation (5) has the additional term (1+Imbalance)×2α/(1−α), which may be tuned to partially offset the Imbalance, considering that α and Imbalance may have opposite signs. The present disclosure is thus related to a balanced photodetector (and a balanced photodetector) operating in accordance with such controlled tuning of the responsivity of the photodiodes, as described in further detail below, for example in relation to FIG. 3 to FIG. 4B. The dependency of the responsivity of a photodiode from two exemplary operating parameters (the bias voltage and the temperature) is illustrated in FIG. 2A to FIG. 2C. It is understood that the numerical values shown and described in relation to FIG. 2A to FIG. 2C are exemplary, to illustrate the aspects of the present disclosure. The graphs in FIG. 2A to FIG. 2C show the normalized responsivity behavior of an epi-engineered III-V photodiode, as an exemplary scenario for describing the aspects of the present disclosure.

FIG. 2A exemplarily shows a graph 200 illustrating the relationship between bias voltage and responsivity of a photodiode (e.g., of the photodiodes 102, 104). The graph shows the value of the normalized responsivity (along the vertical axis 204) as a function of the photodiode bias (PD bias, along the horizontal axis 202, in Volts, V).

The responsivity of the photodiode may be normalized to 1 at a predefined bias voltage (indicated as proposed biasing point 209 in FIG. 2A). As shown by the data points along the curve 206 in the graph 200, a variation of the bias voltage (e.g., an increase or a decrease of the bias voltage) corresponds to a variation of the responsivity of the photodiode (e.g., a decrease or an increase of the responsivity, respectively). Illustratively, a decrease of the bias voltage may correspond to an increase of the responsivity, e.g. a variation in the direction indicated by the first arrow 208a in the graph 200, and an increase of the bias voltage may correspond to a decrease of the responsivity, e.g. a variation in the direction indicated by the second arrow 208b in the graph 200. Based on the diagram of FIG. 2A, there is range (regarding point 209) of tuning per photodiode of the balanced photodetector if the bias deviates correspondingly from its pre-set bias point 209.

FIG. 2B exemplarily shows a graph 210 illustrating the common mode rejection ratio of a balanced photodetector (e.g., of the balanced photodetector 100) before and after active tuning. The graph 210 shows the active CMRR with tuning (along the vertical axis 214, in dB) with respect to the passive CMRR (along the horizontal axis 212, in dB). As the curve 216 in the graph 210 illustrates, the CMRR may improve (e.g., increase) from 12 dB to 16.5 dB under a responsivity drift (e.g., controlled by varying the bias voltage). The graph 210 thus shows that by controlling the responsivity of a photodiode (e.g., by tuning the bias voltage), the CMRR of a balanced photodetector may be increased accordingly. As illustrated, the active CMRR tuning 214 is always higher than the passive CMRR tuning 212, and hence active CMMR tuning 214 can improve the quality of the common output signal of the balanced photo detector.

FIG. 2C exemplarily shows a graph 220 illustrating the relationship between temperature and responsivity of a photodiode (e.g., of the photodiodes 102, 104). The graph shows the value of the normalized responsivity (along the vertical axis 224) as a function of the photodiode temperature (along the horizontal axis 222, in degree Celsius, ° C.).

The responsivity of the photodiode may be normalized to 1 at a predefined temperature. As shown by the data points along the line 226 in the graph 200, a variation of the temperature (e.g., an increase or a decrease of the temperature) corresponds to a variation of the responsivity of the photodiode (e.g., an increase or a decrease of the responsivity, respectively).

The graphs in FIG. 2A to FIG. 2C thus illustrate that upon tuning one or more operating parameters of a photodiode it may be possible to tune the responsivity accordingly, thus providing a control strategy for increasing the CMRR by compensating possible imbalances in a balanced photodetector.

The temperature of the photodiode may be controlled via the control circuit 112. Here, the control circuit 112 may be configured as a local metal heater on chip in the proximity of the photodiode. In other words, the control circuit 112 may be a heating and/or cooling component thermally coupled with the photodiode to set a temperature of the photodiode. Thus, the CMRR can be actively tuned by changing the responsivity of one or more photodiode(s) by controlling the temperature of the respective photodiode.

In addition, responsivity vs temperature, e.g. the control circuit 112 illustrated in FIG. 2C may be combined with the responsivity vs bias voltage, e.g. the control circuit 112 illustrated in FIG. 2C.

Figure 3:
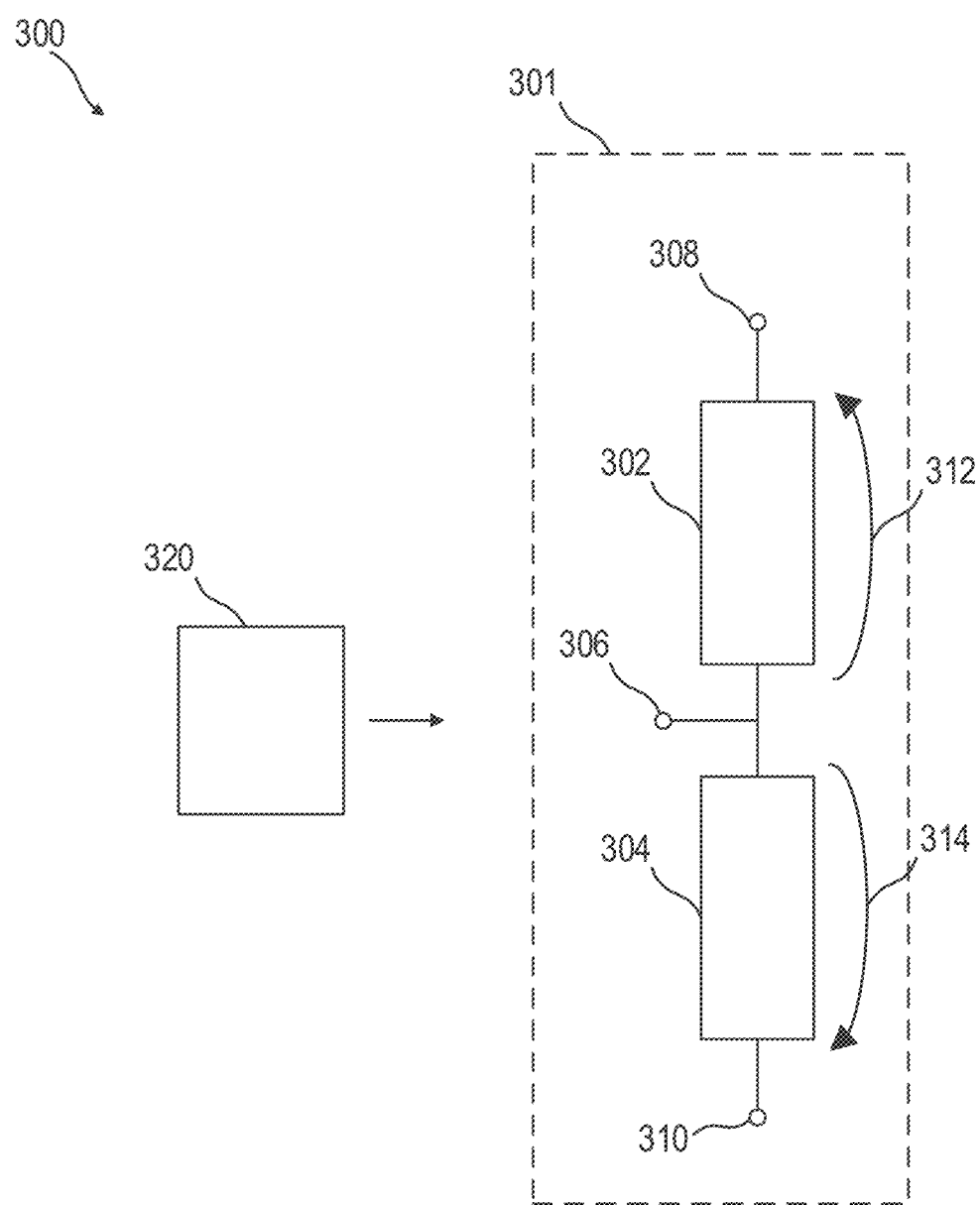
FIG. 3 exemplarily shows a balanced photodetector including a balanced photodetector in a schematic view.

FIG. 3 exemplarily shows a balanced photodetector 300 including a balanced photodetector 301 in a schematic view. The balanced photodetector 301 may be configured as the balanced photodetector 100 described in relation to FIG. 1A and FIG. 1B, and may include a first photodiode 302 and a second photodiode 304 coupled with one another at a common node 306. The first photodiode 302 may be coupled to the common node 306 and to a first supply node 308, and the second photodiode 304 may be coupled to the common node 306 and to a second supply node 310. It is understood that the balanced photodetector 300 may include more than two photodiodes 302, 304; illustratively, the balanced photodetector 300 may include one or more pairs of photodiodes (coupled to a respective common node), each providing a respective balanced photodetector. It is also understood that the representation of the balanced photodetector 300 may be simplified for the purpose of illustration, and that the balanced photodetector 300 may include additional components with respect to those shown (e.g., one or more optical components, an amplifier (see also FIG. 4A), etc.).

The balanced photodetector 300 may be configured to implement the adaptive tuning strategy described herein. The balanced photodetector 300 may include a control circuit 320 configured to control an operation of the balanced photodetector 300 (e.g., an operation of the balanced photodetector 301) to provide an adaptive tuning of the effective responsivity of the photodiodes 302, 304. It is understood that the control circuit 320 may be configured to control the operation of each balanced photodetector of the balanced photodetector 300. As an alternative, the balanced photodetector 300 may include a plurality of control circuits 320, each assigned to one or more balanced photodetectors 301. Illustratively, the control circuit may be configured to set one or more operating parameter of the balanced photodetector(s) 301 to increase a common mode rejection ratio associated with the balanced photodetector(s) 301 (illustratively, associated with the balanced photodetector 300).

The control circuit 320 may be configured to set one or more operating parameters of the balanced photodetector 301 (e.g., of the first photodiode 302 and/or the second photodiode 304) to tune the effective responsivity of the photodiodes 302, 304. As an example, the control circuit 320 may be configured to retrieve the values of the one or more operating parameters from a memory (not shown) associated with the balanced photodetector 300 (e.g., integrated in the balanced photodetector 300, or communicatively coupled with the balanced photodetector 300), for example based on a measured effective responsivity difference between the photodiodes 302, 304. As another example, the control circuit 320 may be configured to set the one or more operating parameters based on an input, e.g. an input of a user operating the balanced photodetector 300. As a further example, the control circuit 320 may be configured to determine an actual effective responsivity difference between the photodiodes 302, 304 (illustratively, an actual effective responsivity imbalance) and to determine (e.g., to calculate) the one or more operating parameters accordingly. The control circuit 320 being configured to set one or more operating parameters of the balanced photodetector 301 may include the control circuit 320 being configured to select one or more values of the operating parameters (e.g., from a range of possible operating parameters) and to control the balanced photodetector 301 accordingly.

As an exemplary configuration, the control circuit 320 may be configured to set the one or more operating parameters based on a known (a priori) difference between the effective responsivities of the photodiodes 302, 304 (e.g., known from a characterization of the balanced photodetector 300 after fabrication) As another exemplary configuration, additionally or alternatively, the control circuit 320 may be configured to set the one or more operating parameters based on a determined (e.g., measured, or calculated) difference between the effective responsivities of the photodiodes 302, 304, which may be a more resource intensive approach but may provide an adaptation to possible further effects affecting the photodiodes 302, 304 during operation.

The control circuit 320 may be configured to set the one or more operating parameters to compensate for a difference between the effective responsivities of the photodiodes 302, 304 (e.g., a difference between the first effective responsivity of the first photodiode 302 and the second responsivity of the second photodiode 304). Illustratively, the first effective responsivity and the second effective responsivity may have an initial difference between one another (e.g., an a priori difference, or an initial difference upon start of the balancing process that the control circuit 320 carries out), and the control circuit 320 may be configured to set the one or more operating parameters to reduce such initial difference (e.g., by a predefined amount, e.g. to zero).

The control circuit 320 may be configured to set the one or more operating parameters of the balanced photodetector 301 to induce a change (illustratively, a known or predefined change) in the effective responsivity of at least one of the photodiodes 302, 304 (in at least one of the first effective responsivity and/or the second effective responsivity). The control circuit 320 may be configured to induce the change in the effective responsivity to reduce the (initial) difference between the first effective responsivity and the second effective responsivity. The control circuit 320 may be configured to determine a change to be provided to compensate the difference in the effective responsivities, and may be configured to set the one or more operating parameters accordingly (e.g., based on a known relationship between a variation in the operating parameter and a variation in the responsivity, as discussed in relation to FIG. 2A and FIG. 2C). The change in the effective responsivity may also be referred to herein as effective responsivity change or effective responsivity variation.

The change in the effective responsivity may include a percentage change in the effective responsivity (e.g., as discussed for the parameter a in Equation (5)), e.g. calculated as the percentage of the ratio of the difference between the value of the effective responsivity after the change and the initial value of the effective responsivity to the initial value of the effective responsivity. The percentage change may be positive (an increased effective responsivity) or negative (a decreased effective responsivity) depending on the compensation to be provided. It is understood that the change in the effective responsivity may also be expressed as an absolute change of the effective responsivity.

Stated in a different fashion, the control circuit 320 may be configured to set the one or more operating parameters of the balanced photodetector 301 to induce a first effective responsivity change in the first effective responsivity and/or a second effective responsivity change in the second effective responsivity, such that an operating difference between the first effective responsivity and the second effective responsivity is less than the initial difference between the first effective responsivity and the second effective responsivity. The operating difference may be understood as an actual (e.g., tuned) difference between the effective responsivities after the change(s) that the setting of the one or more operating parameters induces. The control circuit 320 may be configured to set the one or more operating parameters such that the operating difference between the first effective responsivity and the second effective responsivity is substantially zero (illustratively, becomes substantially zero after the induced change(s)).

As discussed, for example, in relation to FIG. 1A to FIG. 2C, the change in effective responsivity may include a change in the (intrinsic) responsivity of the photodiodes 302, 304. Illustratively, the first effective responsivity change in the first effective responsivity may include a change in the first (intrinsic) responsivity, and/or the second effective responsivity change in the second effective responsivity may include a change in the second (intrinsic) responsivity. In the case that the setting of the one or more operating parameters induces a change in both the first effective responsivity and the second effective responsivity, the control circuit 320 may be configured to set the one or more operating parameters such that the first effective responsivity change and the second responsivity change have a same magnitude and opposite sign with respect to one another (e.g., as discussed in relation to Equation (5)).

In the following, the operation of the control circuit 320 will be described in relation to the tuning of a bias voltage and a temperature of the balanced photodetector 301 (e.g., a bias voltage and a temperature of the first and second photodiode 302, 304). It is however understood that these are exemplary operating parameters that the control circuit 320 may control to tune the effective responsivities of the photodiodes, and that the aspects described herein may apply in a corresponding manner to an operation of the control circuit 320 to tune other operating parameters.

The control circuit 320 may be configured to set the bias voltage of the balanced photodetector 301 to provide a first voltage 312 drop over the first photodiode 302 and/or a second voltage drop 314 over the second photodiode 304, such that the first voltage 312 drop induces the first effective responsivity change in the first effective responsivity and/or the second voltage drop 314 induces the second effective responsivity change in the second effective responsivity. Illustratively, the control circuit 320 may be configured to tune a bias voltage drop over (in other words, across) the first photodiode 302 and the second photodiode 304 to induce the predefined effective responsivity variation in one or both of the photodiodes 302, 304. The voltage drops 312, 314 are illustrated in FIG. 3 with an exemplary orientation, it is however understood that also other orientations may be provided, in accordance with the predefined change to be induced in the responsivity of the photodiodes 302, 304.

The control circuit 320 may be configured to control the bias voltage by controlling the voltages provided at the supply nodes 308, 310 and at the common node 306. For example, the control circuit 320 may include or may control one or more voltage sources to provide voltages at the supply nodes 308, 310 and at the common node 306 to induce the voltage drops over the photodiodes 302, 304 and provide the predefined effective responsivity change(s).

The bias supply approach may have a flexible implementation. The control circuit 320 may be configured to set (e.g., to vary) one or more of the voltages at the supply nodes 308, 310 and at the common node 306 to provide the voltage drop(s) to induce the effective responsivity change(s). The control circuit 320 may be configured to set a first voltage at the first supply node 308, a second voltage at the second supply node 310, and a common voltage at the common node 306 to provide the first voltage drop 312 over the first photodiode 302 and the second voltage drop 314 over the second photodiode 304. Illustratively, starting from a predefined bias voltage (e.g., a proposed biasing point), in which the first voltage drop 312 over the first photodiode 302 and the second voltage drop 314 over the second photodiode 304 are equal to one another, the control circuit 320 may be configured to vary one or more of the voltages at the supply nodes 308, 310 and at the common node 306 to vary the first voltage drop 312 and/or the second voltage drop 314 by a predefined amount to induce the effective responsivity change(s).

The control circuit 320 may be configured to set the bias voltage of the balanced photodetector 301 such that the first voltage drop 312 and the second voltage drop 314 have a predefined difference between one another, in accordance with the difference between the first effective responsivity and the second effective responsivity. The control circuit 320 may be configured to set the bias voltage of the balanced photodetector 301 such that the predefined difference between the first voltage drop 312 and the second voltage drop 314 compensates the difference between the first effective responsivity and the second effective responsivity (e.g., such that the predefined difference between the first voltage drop 312 and the second voltage drop 314 corresponds to an effective responsivity change in the first effective responsivity and/or in the second effective responsivity that reduces or eliminates the difference between the effective responsivities). Illustratively, the predefined difference between the first voltage drop 312 and the second voltage drop 314 may correspond to a change in the first intrinsic responsivity and/or in the second intrinsic responsivity that reduces or eliminates the difference between the effective responsivities. As an exemplary scenario, the control circuit 320 may be configured to set the bias voltage to provide more bias to the one photodiode with more photocurrent output to rebalance the two photodiodes' photocurrents.

The control circuit 320 may be configured to set the bias voltage of the balanced photodetector 301 such that an absolute value of a voltage difference between the first voltage drop 312 and the second voltage drop 314 is associated with (e.g., proportional to) the (initial) difference between the first effective responsivity and the second effective responsivity. Only as a numerical example, the control circuit 320 may be configured to set the bias voltage of the balanced photodetector 301 such that an absolute value of a voltage difference between the first voltage drop 312 and the second voltage drop 314 is in the range from 0 V to 2 V, for example in the range from 0.25 V to 1.5 V, for example in the range from 0.5 V to 1 V.

As an exemplary configuration, the first voltage at the first supply node 308 may be greater than the second voltage at the second supply node 310 (e.g., the first voltage may be a high voltage, such as 3 V, as a numerical example, and the second voltage may be a low voltage, such as a ground voltage, e.g. 0 V as a numerical example). The common voltage at the common node 306 may be at an intermediate voltage value to provide the respective voltage drops 312, 314, illustratively may be less than the first voltage at the first supply node 308 and greater than the second voltage at the second supply node 310. As an exemplary initial scenario, the first voltage may be 3 V, the common voltage may be 1.5 V, and the second voltage may be 0 V, thus providing 1.5 V voltage drops, and the control circuit 320 may be configured to set one or more of the first voltage, second voltage, and/or common voltage to vary the voltage drops from this initial biasing point.

As an additional or alternative operating parameter to tune the effective responsivities of the photodiodes 302, 304 the control circuit 320 may be configured to set the temperature of the balanced photodetector 301 (e.g., the temperature of the first photodiode 302 and/or the temperature of the second photodiode 304) to compensate for the difference between the first effective responsivity and the second effective responsivity.

The control circuit 320 may be configured to set the temperature of the balanced photodetector 301 to provide a first temperature at the first photodiode 302 and a second temperature at the second photodiode 304, such that the first temperature induces the first effective responsivity change in the first effective responsivity and/or the second temperature induces the second effective responsivity change in the second effective responsivity. A temperature at a photodiode 302, 304 may be understood as a temperature of the structure of the photodiode and/or a temperature of the surroundings of the photodiode, e.g. a temperature measurable at one of the electrodes of the photodiode (e.g., at the cathode and/or at the anode of the photodiode).

The control circuit 320 may be configured to set the temperature of the balanced photodetector 301 such that the first temperature and the second temperature have a predefined difference between one another, in accordance with the difference between the first effective responsivity and the second effective responsivity. The control circuit 320 may be configured to set the temperature of the balanced photodetector 301 such that the predefined difference between the first temperature and the second temperature compensates the difference between the first effective responsivity and the second effective responsivity (e.g., such that the predefined difference between the first temperature and the second temperature corresponds to an effective responsivity change in the first effective responsivity and/or in the second effective responsivity that reduces or eliminates the difference between the effective responsivities). Illustratively, the predefined difference between the first temperature and the second temperature may correspond to a change in the first intrinsic responsivity and/or in the second intrinsic responsivity that reduces or eliminates the difference between the effective responsivities.

The control circuit 320 may be configured to set the temperature of the balanced photodetector 301 such that an absolute value of a temperature difference between the first temperature and the second temperature is associated with (e.g., proportional to) the (initial) difference between the first effective responsivity and the second effective responsivity. Only as a numerical example, the control circuit 320 may be configured to set the temperature of the balanced photodetector 301 such that an absolute value of a temperature difference between the first temperature and the second temperature is in the range from 0° C. to 100° C., for example in the range from 20° C. to 60° C., for example in the range from 30° C. to 50° C.

As an exemplary configuration, the balanced photodetector 300 may include a heat source (e.g., a metal heater) configured to provide heat (e.g., to generate heat upon a current flowing into the heat source). The control circuit 320 may be configured to control the heat source to provide heat at the balanced photodetector 301, such that the first photodiode 302 is at the first temperature and the second photodiode 304 is at the second temperature. As an example, the heat source may include a plurality of (partial) heat sources associated with a respective photodiode 302, 304. The heat source may include a first heat source associated with the first photodiode 302 and a second heat source associated with the second photodiode 304. A heat source associated with a photodiode may be implemented by disposing the heat source and the photodiode with respect to one another in such a way that the heat from the heat source influences the temperature of the photodiode (without influencing the temperature of the other photodiode). The control circuit 320 may be configured to control the first heat source to provide heat at the first photodiode such that the first photodiode 302 is at the first temperature and/or to control the second heat source to provide heat at the second photodiode such that the second photodiode 304 is at the second temperature. Starting from an exemplary initial scenario in which both photodiodes are at room temperature, the control circuit 320 may be configured to control the heat source (e.g., the first heat source and/or the second heat source) to vary at least one of the first temperature and/or the second temperature to provide the predefined effective responsivity change(s).

The tuning of the effective responsivity may include tuning the operating parameters individually (as described above) or in combination. Considering the exemplary operating parameters described herein, the control circuit 320 may be configured to set the bias voltage and the temperature of the balanced photodetector 301 such that the respectively induced changes in the first effective responsivity and/or in the second effective responsivity compensate for the initial difference between the effective responsivities. Illustratively, considering the two tuning methods to actively tune the two photodiodes' effective responsivity described herein, by utilizing one of, or both of, these methods to balance the photodiodes' responsivity, an improved CMRR can be achieved to strengthen the photodiode performance (e.g., LIDAR performance in case of a use of the balanced photodetector 300 for LIDAR applications).

Figure 4B:
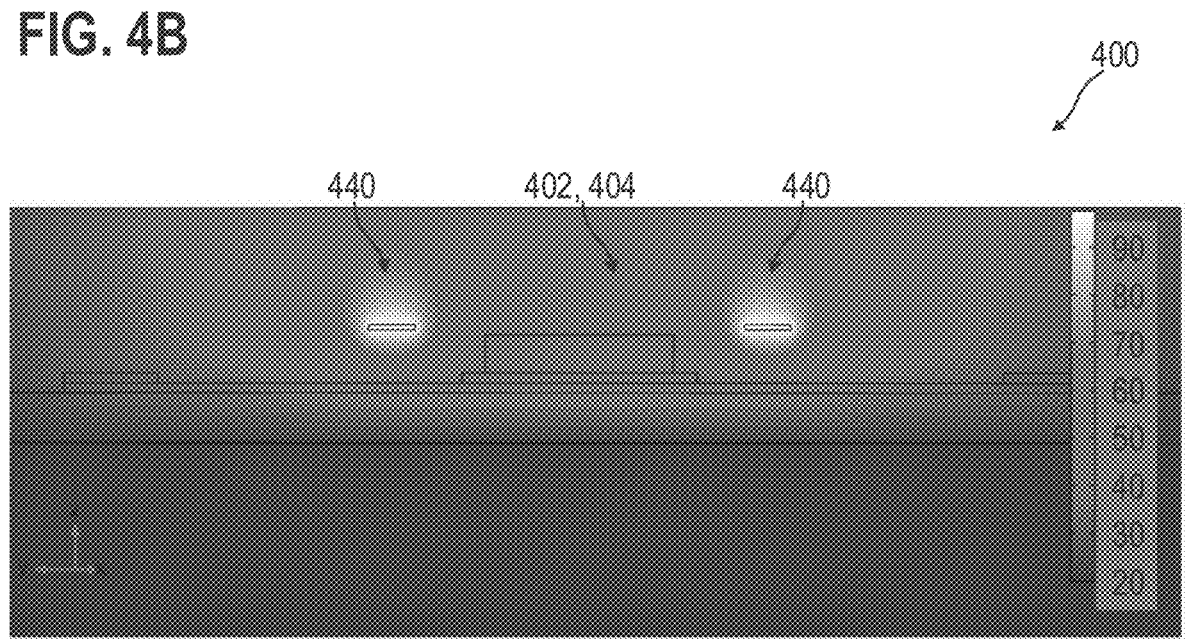

In the following, e.g. with reference to FIG. 4A and FIG. 4B, exemplary configurations of a balanced photodetector to implement the adaptive strategy described herein will be provided. The exemplary configurations in FIG. 4A and FIG. 4B make particular reference to the tuning implemented by controlling the bias voltage (FIG. 4A) and the temperature (FIG. 4B). It is understood that the configurations may be combined with one another, and also that alternative configurations (e.g., with additional, less, or alternative components) may be provided, e.g. to implement the tuning based on these operating parameters or based on other operating parameters.

FIG. 4A and FIG. 4B each exemplarily shows an implementation of a balanced photodetector 400 including a balanced photodetector 401 in a schematic view. The balanced photodetector 400 may be an exemplary realization of the balanced photodetector 300 described in relation to FIG. 3.

The configuration in FIG. 4A describes an exemplary arrangement to implement the tuning of the effective responsivities via tuning of the bias voltage. The balanced photodetector 400 may include a balanced photodetector 401 (e.g., an exemplary configuration of the balanced photodetector 301) with a first photodiode 402 and a second photodiode 404 coupled with one another at a common node 406, e.g. with the first photodiode 402 coupled between the common node 406 and a first supply node 408, and with the second photodiode 404 coupled between the common node 406 and a second supply node 410.

In the configuration in FIG. 4A, the first photodiode 402 may be connected to the first supply node 408 (which may be configured to receive a high voltage, $V_{HIGH}$) at its cathode, and the second photodiode 404 may be connected to the second supply node 410 (which may be configured to receive a low voltage, $V_{LOW}$) at its anode. The common electrode bias (illustratively, the common voltage at the common node 406) may be regulated by a bias regulating port with bias of $V_{REG}$.

The balanced photodetector 400 may include a transimpedance amplifier 420 coupled with the common node 406. The transimpedance amplifier 420 may be configured to receive and amplify the photocurrent resulting from the first photocurrent that the first photodiode 402 generates and the second photocurrent that the second photodiode 404 generates. Illustratively, the transimpedance amplifier 420 may be configured to receive the first photocurrent associated with the first photodiode 402 and the second photocurrent associated with the second photodiode 404 (e.g., a combined current as a combination of the first photocurrent and the second photocurrent). The transimpedance amplifier 420 may be configured to provide a voltage output (at an output terminal 422) corresponding to the received photocurrent(s), e.g. a voltage output as a combination of the first photocurrent and the second photocurrent with one another. The voltage output may provide an amplified representation of the received photocurrent(s). The transimpedance amplifier 420 may thus assist the detection process by amplifying the signal that the balanced photodetector 401 generates.

The general configuration of a transimpedance amplifier 420 may be known in the art, e.g. with an operational amplifier 424, a capacitor 426, and a resistor 428, defining a loop to amplify the received signal (e.g., the received photocurrent(s)) and provide the (amplified) voltage output.

As an exemplary configuration to implement the bias voltage tuning, one of the non-inverting terminal 430 or the inverting terminal 432 of the transimpedance amplifier 420 (illustratively, one of the non-inverting terminal or the inverting terminal of the operational amplifier 424) may be coupled with a voltage source 434. The other one of the non-inverting terminal 430 or the inverting terminal 432 of the transimpedance amplifier 420 (illustratively, the other one of the non-inverting terminal or the inverting terminal of the operational amplifier 424) may be coupled with the common node 406. In the exemplary configuration in FIG. 4A, the voltage source 434 may be coupled between the inverting terminal 432 and ground, and the non-inverting terminal 430 may be coupled to the common node 406. It is however understood that also other configurations may be provided, e.g. with the voltage source between the non-inverting terminal 430 and ground, and with the inverting terminal 432 coupled to the common node 406. It is also understood that the voltage source 434 provides an exemplary arrangement to control the voltage at the common node 406, and other arrangements may be provided (e.g., with a current source, a current mirror, etc.).

The balanced photodetector 400 may include a control circuit (not shown, e.g. configured as the control circuit 320 described in FIG. 3), configured to control the voltage source 434 to provide the common voltage at the common node 406, e.g. to provide a first voltage drop over the first photodiode 402 and a second voltage drop over the second photodiode 404.

Considering an exemplary scenario, the initial status of $V_{REG}$ may be set at 1.5 V, so that both photodiodes are biased at reverse 1.5 V. Thus, shifting $V_{REG}$ from 1.5 V may create a push-pull style bias change across the two photodiodes 402, 404 (as described in relation to FIG. 3). An additional or alternative approach, $V_{REG}$ may be kept at a fixed value (e.g., 1.5 V), and the control circuit may regulate $V_{HIGH}$ and/or $V_{LOW}$ (e.g., by controlling a respective voltage source, not shown).

The configuration in FIG. 4B describes an exemplary arrangement to implement the tuning of the effective responsivities via tuning of the temperature. The configuration in FIG. 4B may be implemented in addition or as an alternative to the configuration in FIG. 4A. The balanced photodetector 400 may include a metal heater 440 surrounding a photodiode 402, 404 (e.g., one metal heater for each photodiode 402, 404). For example, transmission electron microscopy (TEM) or scanning electron microscopy (SEM) may be used to reveal the presence of a heater structure surrounding a photodiode 402, 404. The heater-based tuning may illustratively include controlling the photodiode temperature via placing a local metal heater near the photodiode 402, 404 (e.g., on chip near photodiode, for example at a distance less than 5 mm, or less than 1 mm). FIG. 4B shows thermal simulation of a generic photodiode (e.g., of one of the photodiodes 402, 404) with two metal heaters 440 placed on each of photodiode, serving as heat source. The color gradient indicates the temperature gradient (as indicated by the color bar from 20° C. to 90° C. as an exemplary range), as an exemplary temperature control.

In the following, e.g. in relation to FIG. 5, the application of a balanced photodetector configured as described herein will be illustrated in the context of LIDAR applications. It is however understood that the balanced photodetector may also be part of different types of detection systems (e.g., of a frequency modulation spectrometer, a light scattering spectrometer, an infrared gas sensor, etc. as other examples). FIG. 5 illustratively shows a light emission and detection system.

FIG. 5 exemplarily shows a LIDAR system 500 including a balanced photodetector 501 in a schematic view. The balanced photodetector 501 may be configured as the balanced photodetector 300, 400 described in relation to FIG. 3 to FIG. 4B, e.g. including a balanced photodetector with a first photodiode 502 and a second photodiode 504 coupled with one another at a common node 506 (e.g., between the common node 506 and a first supply node 508, and between the common node 506 and a second supply node 510, respectively). It is understood that the representation of the LIDAR system 500 may be simplified for the purpose of illustration, and the LIDAR system may include additional components with respect to those shown (e.g., a processing circuit, one or more additional optical components, etc.).

The LIDAR system 500 may be configured for coherent LIDAR detection, e.g. for Frequency Modulated Continuous Wave (FMCW) LIDAR detection, illustratively for emission of continuous light having a varying frequency over time (e.g. a frequency varying from a starting frequency to a final frequency, and back). The coherent detection may include mixing (at the balanced photodetector 501) light from a light source of the LIDAR system 500 (not shown) with light reflected back from the field of view of the LIDAR system 500 (e.g., from an object in the field of view). The shift in frequency between the light that the light source emits and the light that is reflected back provides determining one or more properties of the objects in the field of view (e.g., velocity, direction of motion, and the like), as known in the art.

The LIDAR system 500 may include a light source configured to emit light (e.g., frequency modulated light, for example the light source may include a local oscillator), and one or more optical components to provide part of the light to the balanced photodetector 501 and part of the light towards the field of view. The one or more optical components may be configured such that the balanced photodetector 501 receives the light that the light source emits and the light that is reflected back towards the LIDAR system 500 from the field of view, to provide coherent detection. Illustratively, the light that the light source emits may provide a reference light signal, and upon combination with the light from the field of view information may be derived on the objects present in the field of view.

As an example, the light source may be or may include a laser source. The laser source may be or may include a laser diode (e.g., a vertical cavity surface emitting laser diode or an edge-emitting laser diode) or a plurality of laser diodes (e.g., arranged in a one-dimensional or two-dimensional array). The light source may be configured to emit light in a predefined wavelength range, e.g. in accordance with a predefined detection scheme for the LIDAR system 500. As an example, the light source may be configured to emit light in the infrared or near-infrared wavelength range, e.g., in the range from about 700 nm to about 5000 nm, for example in the range from about 900 nm to about 2000 nm, or for example at 905 nm or 1550 nm.

The LIDAR system 500 may include an optical coupler 514 configured to receive a portion of the light that the light source emits (e.g., at a first input port 516a) and to receive light from the field of view of the LIDAR system (e.g., at a second input port 516b). The optical coupler 514 may be configured to optically couple the light from the field of view and the light that the light source emits with one another to provide output light. The optical coupler 514 may be configured to provide a first portion of the output light at the first photodiode 502 (at a first output port 518a optically coupled with the first photodiode 502) and a second portion of the output light at the second photodiode 504 (at a second output port 518b optically coupled with the second photodiode 504). The optical coupling and the differential detection that the balanced photodetector 501 provides determining differences between the light from the light source and light from the field of view. The improved CMRR of the balanced photodetector 501, configured as described herein, allows increasing the detection range of the LIDAR system 500. For example, the product specification of a LIDAR system with a balanced photodetector implementing the strategy described herein may show the CMRR tuning method and range if active tuning is applied.

In FIG. 5, the optical coupler 514 may be or may include a 2×2 multi-mode interferometer, with a first input waveguide associated with (e.g., optically coupled with) the light source, a second input waveguide associated with the field of view, a first output waveguide associated with the first photodiode 502, and a second output waveguide associated with the second photodiode 504. The optical loss in the multi-mode interferometer, e.g. the optical losses in the input and/or output waveguides may be considered in the effective responsivities associated with the photodiodes 502, 504, as described above. It is however understood that a 2×2 multi-mode interferometer is only an example of an optical component configured to enable the coherent detection, and other optical components may be provided to implement a same function.

It may be common for coherent detection such as Frequency Modulated Continuous Wave (FMCW) Light Detection and Ranging (Lidar) to deploy balanced photodetector (BPD) as differential photo receiver, and the strategy described herein provides an improved SNR for the LIDAR detection. The 2×2 multimode interferometer (MMI) may be configured to mix the local oscillator (LO) light and the target ranging signal light into two output ports and feed them into the balanced photodetector. The balanced photodetector may include two identical photodiodes with a common p- and n-electrodes tied together. With the assumption of equal power outputs from the 2×2 MMI and the equal responsivity from the two photodiodes, the DC component from the two photodiodes' photocurrent may be cancelled out, while the differential RF component of the photocurrents may be delivered to next stage transimpedance amplifier (not shown). The strategy described herein may provide a more efficient approach compared to using an inline attenuator of amplifier added between the 2×2 MMI and the photodiodes.

The LIDAR system 500 may further include one or more optical components to direct part of the emitted light (e.g., 50% of the emitted light) to the balanced photodetector 501 and part of the emitted light (e.g., the other 50% of the emitted light) towards the field of view. In the configuration in FIG. 5, the LIDAR system 500 may include an optical component 512 (e.g., an optical coupler or splitter) configured to receive the light that the light source emits (illustratively, the light from the local oscillator of the LIDAR system 500), and to direct a first portion of the light towards the field of view of the LIDAR system and to direct a second portion of the light towards the optical coupler 514.

Figure 6:
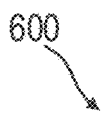
FIG. 6 exemplarily shows a schematic flow diagram of a method of operating a balanced photodetector including a balanced photodetector.
Figure 6:

FIG. 6 exemplarily shows a schematic flow diagram of a method 600 of operating a balanced photodetector including a balanced photodetector (e.g., a method of operating the balanced photodetector 300, 400, 501 described in relation to FIG. 3 to FIG. 5). The method 600 may be understood as a method of increasing a common mode rejection ratio of a balanced photodetector (e.g., of a balanced photodetector).

The method 600 may include, in 610, setting one or more operating parameters of the balanced photodetector to compensate for a difference between a first effective responsivity of a first photodiode and a second effective responsivity of a second photodiode of the balanced photodetector. Setting the one or more operating parameters may include setting a first operating parameter of the first photodiode and/or setting a second operating parameter of the second photodiode.

As an example, setting the one or more operating parameters may include setting a bias voltage of the balanced photodetector to provide a first voltage drop over the first photodiode and/or to provide a second voltage drop over the second photodiode. Illustratively, setting the one or more operating parameters may include setting the first voltage drop and/or setting the second voltage drop. The setting of the bias voltage may be configured to provide a predefined difference between the first voltage drop and the second voltage drop in accordance with the (initial) difference between the effective responsivity of the photodiodes. The setting of the bias voltage may include controlling one or more voltage sources to provide voltages at the nodes to which the photodiodes are coupled.

As another example, additionally or alternatively, setting the one or more operating parameters may include setting a temperature of the balanced photodetector to provide a first temperature at the first photodiode and/or to provide a second temperature at the second photodiode. Illustratively, setting the one or more operating parameters may include setting a first temperature at the first photodiode and/or setting a second temperature at the second photodiode. The setting of the temperature may be configured to provide a predefined difference between the first temperature and the second temperature in accordance with the (initial) difference between the effective responsivity of the photodiodes.

As an exemplary configuration, setting the temperature of the balanced photodetector may include controlling a heat source (e.g., a metal heater) of the balanced photodetector to provide heat to the first and/or second photodiode to set the first and/or second temperature.

Setting the one or more operating parameters may induce an effective responsivity change in the effective responsivity of the photodiodes, e.g. a first effective responsivity change in the first effective responsivity of the first photodiode and/or a second effective responsivity change in the second effective responsivity of the second photodiode. The first effective responsivity change and/or the second effective responsivity change may be selected to compensate for an initial difference between the first effective responsivity and the second effective responsivity. Illustratively, setting the one or more operating parameters may be carried out to provide a same effective responsivity for the first photodiode and the second photodiode.

The active CMRR tuning method described herein utilizes the responsivity vs operating parameter (e.g., the responsivity vs bias or responsivity vs temperature) behavior of a balanced photodetector. By suitably designing the balanced photodetector (e.g., by designing the photodiode's junction epi structure), a variation of the responsivity for varying operating parameter may be achieved. As shown, for example, in FIG. 2A to FIG. 2C, a negative sloped responsivity curve vs bias, and a positive sloped responsivity vs temperature may be provided. Using balanced photodetector bias control, or localized metal heater, as examples, the responsivity of the two photodiodes may be controlled simultaneously as a pair.

Figure 7:
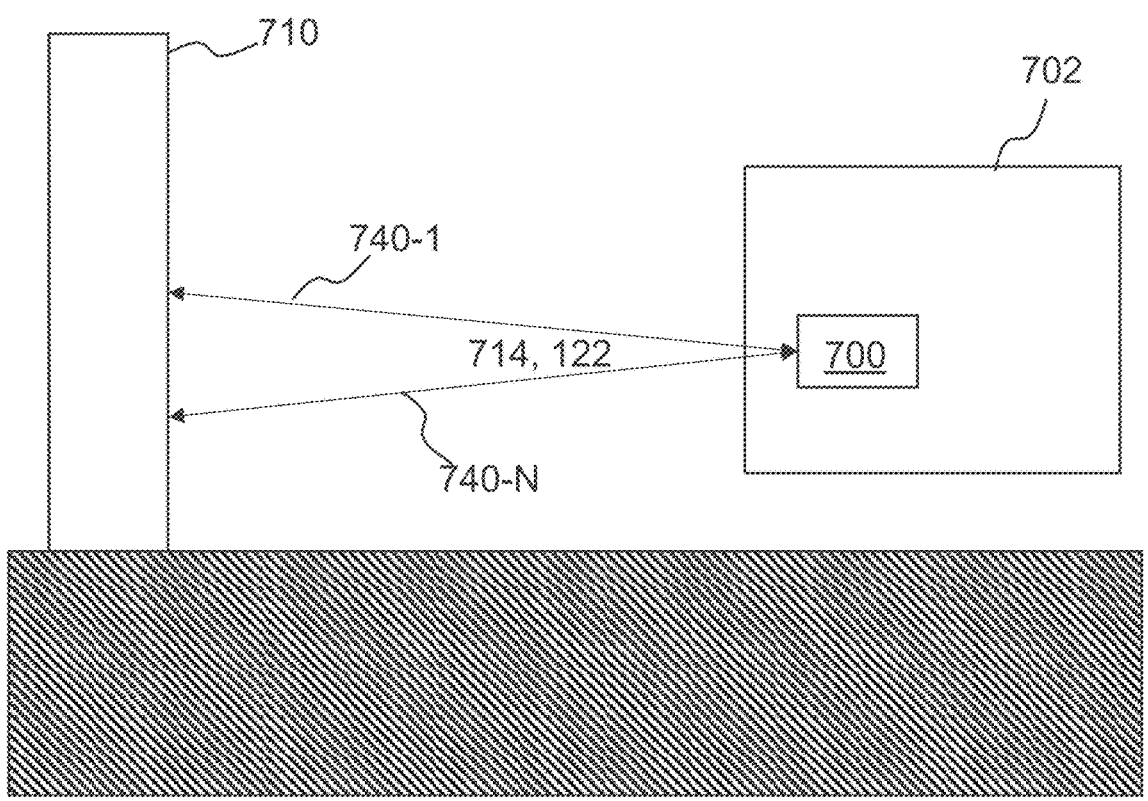
FIG. 7 illustrates a schematic diagram of a vehicle having a LIDAR system.

FIG. 7 illustrates a schematic diagram of a vehicle 702 having a LIDAR system 700 integrated therein, as an example. The vehicle 702 may be an unmanned/autonomous vehicle, e.g. unmanned/autonomous aerial vehicle, unmanned/autonomous automobile, or autonomous robot. In addition, LIDAR system 700 may be used in a mobile device such as a smartphone or tablet. The vehicle 702 may be an autonomous vehicle. Here, the LIDAR system 700 may be used to control the direction of travel of the vehicle 702. The LIDAR system 700 may be configured for obstacle, object depth or velocity detection outside of the vehicle 702, as an example. Alternatively or in addition, the vehicle 702 may require a driver or teleoperator to control the direction of travel of the vehicle 702. The LIDAR system 700 may be a driving assistant. As an example, the LIDAR system 700 may be configured for obstacle detection, e.g. determining a distance and/or direction and relative velocity of an obstacle (target 710) outside of the vehicle 702. The LIDAR system 700 may be configured, along one or more optical channels 740-*i* (with i being one between 1 to N and N being the number of channels of the PIC), to emit light 714 from one or more outputs of the LIDAR system 700, e.g. outputs of the light paths, and to receive light 122 reflected from the target 710 in one or more light inputs of the LIDAR system 700. The structure and design of the outputs and inputs of the light paths of the LIDAR system 700 may vary depending on the working principle of the LIDAR system 700. Alternatively, the LIDAR system 700 may be or may be part of a spectrometer or microscope. However, the working principle may be the same as in a vehicle 702.

In the following, various examples are provided that may include one or more aspects described above with reference to a balanced photodetector (e.g., the balanced photodetector 100, 300, 400, 501), a balanced photodetector (e.g., the balanced photodetector 100, 301, 401, 501), and methods (e.g., the method 600). It may be intended that examples described in relation to the balanced photodetector or the balanced photodetector may apply also to the methods, and vice versa.

Example 1 is a balanced photodetector including: a balanced photodetector including a first photodiode and a second photodiode coupled with one another at a common node, wherein the first photodiode has a first effective responsivity and the second photodiode has as second effective responsivity; and a control circuit configured to set an operating parameter of the balanced photodetector to compensate for a difference between the first effective responsivity and the second effective responsivity.

In Example 2, the balanced photodetector according to example 1 may optionally further include that the control circuit is configured to set the operating parameter of the balanced photodetector to induce an effective responsivity change in at least one of the first effective responsivity and/or the second effective responsivity to reduce the difference between the first effective responsivity and the second effective responsivity.

In Example 3, the balanced photodetector according to example 1 or 2 may optionally further include that the first effective responsivity includes a first (e.g., intrinsic) responsivity of the first photodiode and a first optical loss associated with the first photodiode, that the second effective responsivity includes a second (e.g., intrinsic) responsivity of the second photodiode and a second optical loss associated with the second photodiode, and that the effective responsivity change in at least one of the first effective responsivity and/or the second effective responsivity includes a change in at least one of the first responsivity and/or the second responsivity.

In Example 4, the balanced photodetector according to any one of examples 1 to 3 may optionally further include that the control circuit is configured to set the operating parameter of the balanced photodetector to induce a first effective responsivity change in the first effective responsivity and a second effective responsivity change in the second effective responsivity, and that the first effective responsivity change and the second effective responsivity change have a same magnitude and opposite sign with respect to one another.

In Example 5, the balanced photodetector according to any one of examples 1 to 4 may optionally further include that the operating parameter of the balanced photodetector includes at least one of a bias voltage and/or a temperature of the balanced photodetector.

In Example 6, the balanced photodetector according to example 5 may optionally further include that the control circuit is configured to set the bias voltage of the balanced photodetector to provide a first voltage drop over the first photodiode and/or a second voltage drop over the second photodiode, such that the first voltage drop induces the first effective responsivity change in the first effective responsivity and/or the second voltage drop induces the second effective responsivity change in the second effective responsivity.

In Example 7, the balanced photodetector according to example 6 may optionally further include that the control circuit is configured to set the bias voltage of the balanced photodetector such that an absolute value of a voltage difference between the first voltage drop and the second voltage drop is in the range from 0 V to 2 V, for example in the range from 0.25 V to 1.5 V, for example in the range from 0.5 V to 1 V.

In Example 8, the balanced photodetector according to example 6 or 7 may optionally further include that the first photodiode is coupled between a first supply node and the common node, that the second photodiode is coupled between the common node and a second supply node, and that the control circuit is configured to set a first voltage at the first supply node, a second voltage at the second supply node, and a common voltage at the common node to provide the first voltage drop over the first photodiode and the second voltage drop over the second photodiode.

In Example 9, the balanced photodetector according to example 8 may optionally further include that the first voltage at the first supply node is greater than the second voltage at the second supply node, and that the common voltage at the common node is less than the first voltage at the first supply node and greater than the second voltage at the second supply node.

In Example 10, the balanced photodetector according to example 8 or 9 may optionally further include that the first photodiode includes a first cathode coupled with the first supply node and a first anode coupled with the common node, and that the second photodiode includes a second cathode coupled with the common node and a second anode coupled with the second supply node.

In Example 11, the balanced photodetector according to any one of examples 5 to 10 may optionally further include that the control circuit is configured to set the temperature of the balanced photodetector to provide a first temperature at the first photodiode and a second temperature at the second photodiode, such that the first temperature induces the first effective responsivity change in the first effective responsivity and/or the second temperature induces the second effective responsivity change in the second effective responsivity (e.g., independently, or in combination with the change induced by the first and/or second voltage drop).

In Example 12, the balanced photodetector according to example 11 may optionally further include that the control circuit is configured to set the temperature of the balanced photodetector such that an absolute value of a temperature difference between the first temperature and the second temperature is in the range from 0° C. to 100° C., for example in the range from 20° C. to 60° C., for example in the range from 30° C. to 50° C.

In Example 13, the balanced photodetector according to example 11 or 12 may optionally further include that the balanced photodetector includes a heat source configured to provide heat, and that the control circuit is configured to control the heat source to provide heat at the balanced photodetector, such that the first photodiode is at the first temperature and the second photodiode is at the second temperature.

In Example 14, the balanced photodetector according to example 13 may optionally further include that the heat source is or includes a metal heater.

In Example 15, the balanced photodetector according to example 13 or 14 may optionally further include that the heat source includes a first heat source associated with the first photodiode and a second heat source associated with the second photodiode, that the control circuit is configured to control the first heat source to provide heat at the first photodiode such that the first photodiode is at the first temperature and/or that the control circuit is configured to control the second heat source to provide heat at the second photodiode such that the second photodiode is at the second temperature.

In Example 16, the balanced photodetector according to any one of examples 1 to 15 may optionally further include that at least one of the first photodiode and/or the second photodiode includes an epi-engineered photodiode (for example, a III-V photodiode).

In Example 17, the balanced photodetector according to any one of examples 1 to 16 may optionally further include a transimpedance amplifier coupled with the common node, wherein the transimpedance amplifier is configured to: receive a first photocurrent associated with the first photodiode and a second photocurrent associated with the second photodiode, and provide a voltage output as a combination of the first photocurrent and the second photocurrent with one another.

In Example 18, the balanced photodetector according to example 17 may optionally further include that one of a non-inverting terminal or an inverting terminal of the transimpedance amplifier is coupled with the common node, and that the other one of the non-inverting terminal or the inverting terminal of the transimpedance amplifier is coupled with a voltage source.

In Example 19, the balanced photodetector according to example 18 may optionally further include that the control circuit is configured to control the voltage source to provide the common voltage at the common node.

In Example 20, the balanced photodetector according to any one of examples 1 to 19 may optionally further include that the control circuit is configured to set the operating parameter of the balanced photodetector to increase a common mode rejection ratio associated with the balanced photodetector.

Example 21 is a Light Detection and Ranging (LIDAR) module including the balanced photodetector according to any one of examples 1 to 20.

In Example 22, the LIDAR system according to example 21 may optionally further include: a light source configured to emit light, and an optical coupler configured to: receive a portion of the light that the light source emits; receive light from the field of view of the LIDAR system; optically couple the light from the field of view and the light that the light source emits with one another to provide output light; and provide a first portion of the output light at the first photodiode and a second portion of the output light at the second photodiode.

In Example 23, the LIDAR system according to example 22 may optionally further include: an optical component configured to: receive the light that the light source emits; direct a first portion of the light towards the field of view of the LIDAR system; and direct a second portion of the light towards the optical coupler.

In Example 24, the LIDAR system according to example 22 or 23 may optionally further include that the optical coupler is or includes a 2×2 multi-mode interferometer, the 2×2 multi-mode interferometer including: a first input waveguide associated with the light source; a second input waveguide associated with the field of view; a first output waveguide associated with the first photodiode; and a second output waveguide associated with the second photodiode.

In Example 25, the LIDAR system according to any one of examples 22 to 24 may optionally further include that the light source is configured to emit frequency modulated light.

Example 26 is a balanced photodetector including: a balanced photodetector including a first photodiode having a first effective responsivity and a second photodiode having a second effective responsivity, wherein the first effective responsivity and the second effective responsivity have an initial difference between one another; and a control circuit configured to set an operating parameter of the balanced photodetector to induce a first effective responsivity change in the first effective responsivity and a second effective responsivity change in the second effective responsivity, such that an operating difference between the first effective responsivity and the second effective responsivity is less than the initial difference the first effective responsivity and the second effective responsivity.

In Example 27, the balanced photodetector according to example 26 may optionally further include that the control circuit is configured to set the operating parameter of the balanced photodetector such that the operating difference between the first effective responsivity and the second effective responsivity is substantially zero.

In Example 28, the balanced photodetector according to example 26 or 27 may optionally further include one or more features of any one of the examples 1 to 25.

Example 29 is a balanced photodetector including: a balanced photodetector including a first photodiode and a second photodiode coupled with one another at a common node, wherein the first photodiode has a first response function to incoming light and the second photodiode has as second response function to incoming light; and a control circuit configured to set an operating parameter of the balanced photodetector to compensate for a difference between the first response function and the second response function.

In Example 30, the balanced photodetector according to example 29 may optionally further include one or more features of any one of the examples 1 to 28.

Example 31 is a method of operating a balanced photodetector, the balanced photodetector including a balanced photodetector with a first photodiode and a second photodiode, wherein the first photodiode has a first effective responsivity and the second photodiode has a second effective responsivity, the method including: setting an operating parameter of the balanced photodetector to compensate for a difference between the first effective responsivity and the second effective responsivity.

In Example 32 the method according to example 31 may optionally further include that the operating parameter of the balanced photodetector includes at least one of a bias voltage and/or a temperature of the balanced photodetector.

In Example 33, the method according to example 31 or 32 may optionally further include one or more features of any one of the examples 1 to 30.

Example 34 is one or more non-transitory computer readable media including programmable instructions thereon, that when executed by one or more processors of a device (e.g., of a balanced photodetector), cause the device to perform the method according to any one of examples 31 to 33.

Example 35 is a method of increasing a common mode rejection ratio of a balanced photodetector, the method including: setting a first operating parameter of a first photodiode of the balanced photodetector to induce a first effective responsivity change in a first effective responsivity of the first photodiode; and setting a second operating parameter of a second photodiode of the balanced photodetector to induce a second effective responsivity change in a second effective responsivity of the second photodiode, wherein the first effective responsivity change and the second effective responsivity change are selected to compensate for an initial difference between the first effective responsivity and the second effective responsivity.

In Example 36 the method according to example 35 may optionally further include that setting the first operating parameter of the first photodiode includes at least one of setting a first voltage drop over the first photodiode and/or setting a first temperature at the first photodiode, and that setting the second operating parameter of the second photodiode includes at least one of setting a second voltage drop over the second photodiode and/or setting a second temperature at the second photodiode.

In Example 37, the method according to example 35 or 36 may optionally further include one or more features of any one of the examples 1 to 34.

Example 38 is one or more non-transitory computer readable media including programmable instructions thereon, that when executed by one or more processors of a device (e.g., of a balanced photodetector), cause the device to perform the method according to any one of examples 35 to 37.

Example 39 is a method of operating a balanced photodetector, the balanced photodetector including a balanced photodetector with a first photodiode and a second photodiode, the method including: setting an operating parameter of the balanced photodetector to provide a same effective responsivity for the first photodiode and the second photodiode.

In Example 40, the method according to example 39 may optionally further include that the operating parameter of the balanced photodetector includes at least one of a bias voltage and/or a temperature of the balanced photodetector.

In Example 41, the method according to example 39 or 40 may optionally further include one or more features of any one of the examples 1 to 38.

Example 42 is one or more non-transitory computer readable media including programmable instructions thereon, that when executed by one or more processors of a device (e.g., of a balanced photodetector), cause the device to perform the method according to any one of examples 39 to 41.

Example 43 is a balanced photodetector including: a balanced photodetector including a first photodiode and a second photodiode coupled with one another at a common node, wherein the first photodiode has a first (intrinsic) responsivity and the second photodiode has as second (intrinsic) responsivity; and a control circuit configured to set an operating parameter of the balanced photodetector to induce a first change in the first responsivity and/or a second change in the second responsivity to compensate for a difference between a first response function of the first photodiode and a second response function of the second photodiode.

In Example 44, the balanced photodetector according to example 43 may optionally further include one or more features of any one of the examples 1 to 42.

Example 45 is a photonic integrated circuit including a semiconductor substrate having integrated: one or more optical channels (each) configured to emit coherent light to an outside and to receive coherent light from the outside; wherein (each of) the optical channel(s) may include a balanced photodetector may include at least a first photodiode, a second photodiode, and a control circuit, the control circuit configured to adjust the responsivity of the first photodiode and to adjust the responsivity of the second photodiode, wherein the balanced photodetector is configured to provide a common output signal based on the coherent lights from the outside received at the first photodiode and the second photodiode.

In Example 46, the subject matter of Example 45 can optionally include that the control circuit is configured to reduce an imbalance of the responsivities of the first photodiode and the second photodiode.

In Example 47, the subject matter of Example 45 or 46 can optionally include that at least one of the first photodiode and the second photodiode may include a III-V epi-structure.

In Example 48, the subject matter of any one of Examples 45 to 47 can optionally include that the first photodiode and the second photodiode include the same epi-structure.

In Example 49, the subject matter of any one of Examples 45 to 4 can optionally include that the control circuit may include a heater configured to adjust a temperature of at least one of the first photodiode or second photodiode.

In Example 50, the subject matter of any one of Examples 45 to 49 can optionally include that the control circuit may include at least a first heater and a second heater, wherein at least one photodiode of the first photodiode and the second photodiode is arranged between the first heater and the second heater.

In Example 51, the subject matter of any one of Examples 45 to 50 can optionally include that at least one heater is spatially arranged between the first photodiode and the second photodiode.

In Example 52, the subject matter of Example 51 can optionally include that the heater is equidistant to the first photodiode and to the second photodiode.

In Example 53, the subject matter of any one of Examples 45 to 52 can optionally include that the control circuit may include a voltage supply configured to adjust a bias voltage at at least one electrode of the first photodiode or second photodiode.

In Example 54, the subject matter of any one of Examples 45 to 53 can optionally include that the control circuit may include a direct current bias voltage source connected to an inductor.

In Example 55, the subject matter of any one of Examples 45 to 54 can optionally include that the balanced photodetector may include an output port coupled to the first photodiode and the second photodiode, wherein the output port is configured to provide the common output signal.

In Example 56, the subject matter of any one of Examples 45 to 55 can optionally include that each of the first photodiode and the second photodiode may include an anode and a cathode, and wherein the control circuit is coupled to a node arranged between and coupled to the first photodiode and the second photodiode.

In Example 57, the subject matter of any one of Examples 45 to 56 can optionally include that the first photodiode is coupled to a first voltage source and the second photodiode is coupled to a second voltage source, wherein the control circuit provides a bias voltage between a voltage of the first voltage source and a voltage of the second voltage source.

In Example 58, the subject matter of Example 57 can optionally include that the bias voltage is associated with an imbalance between the first photodiode and the second photodiode.

In Example 59, the subject matter of any one of Examples 45 to 58 can optionally include that each of the first photodiode and the second photodiode may include an anode and a cathode, and wherein the first photodiode and the second photodiode are electrically in series.

In Example 60, the subject matter of any one of Examples 45 to 59 can optionally include a controller configured to control the control circuit and determine the common output signal.

Example 61 is a light detection and ranging system may include a photonic integrated circuit of any one of Examples 45 to 60. The light detection and ranging system further may include an optical system configured to guide light from the photonic integrated circuit within an angular range to the outside of the light detection and ranging system.

Example 62 is a vehicle including a light detection and ranging system may of Example 61.

The word "exemplary" is used herein to mean "serving as an example, instance, or illustration." Any example or design described herein as "exemplary" is not necessarily to be construed as preferred or advantageous over other examples or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

The terms "processor" or "controller" as, for example, used herein may be understood as any kind of technological entity that allows handling of data. The data may be handled according to one or more specific functions that the processor or controller execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "connected" can be understood in the sense of a (e.g. mechanical and/or electrical), e.g. direct or indirect, connection and/or interaction. For example, several elements can be connected together mechanically such that they are physically retained (e.g., a plug connected to a socket) and electrically such that they have an electrically conductive path (e.g., signal paths exist along a communicative chain).

While the above descriptions and connected figures may depict electronic device components as separate elements, skilled persons will appreciate the various possibilities to combine or integrate discrete elements into a single element. Such may include combining two or more circuits from a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A balanced photodetector system comprising:
   a balanced photodetector comprising a first photodiode and a second photodiode coupled with one another at a common node, wherein the first photodiode has a first effective responsivity and the second photodiode has as second effective responsivity, wherein the first effective responsivity comprises a first response function describing a first photocurrent that the first photodiode generates in response to incident light, wherein the second effective responsivity comprises a second response function describing a second photocurrent that the second photodiode generates in response to incident light; and
   a control circuit configured to set an operating parameter of the balanced photodetector to compensate for a difference between the first effective responsivity and the second effective responsivity, wherein the operating parameter comprises a bias voltage supplied to the common node or a temperature of the balanced photodetector, wherein:
   the control circuit is configured to adjust the bias voltage to the common node based on the difference between the first effective responsivity and the second effective responsivity; or
   wherein the control circuit is configured to adjust the temperature of the balanced photodetector based on the difference between the first effective responsivity and the second effective responsivity.

2. The balanced photodetector system according to claim 1,
   wherein the control circuit is configured to set the operating parameter of the balanced photodetector to induce an effective responsivity change in at least one of the first effective responsivity and/or the second effective responsivity to reduce the difference between the first effective responsivity and the second effective responsivity.

3. The balanced photodetector system according to claim 2,
   wherein the first effective responsivity comprises a first responsivity according to first response function of the first photodiode and a first optical loss associated with the first photodiode,
   wherein the second effective responsivity comprises a second responsivity according to second response function of the second photodiode and a second optical loss associated with the second photodiode, and wherein the effective responsivity change in at least one of the first effective responsivity and/or the second effective responsivity comprises a change in at least one of the first responsivity and/or the second responsivity.

4. The balanced photodetector system according to claim 1, wherein the control circuit is configured to set the operating parameter of the balanced photodetector to induce a first effective responsivity change in the first effective responsivity and a second effective responsivity change in the second effective responsivity, and wherein the first effective responsivity change and the second effective responsivity change have a same magnitude and opposite sign with respect to one another.

5. The balanced photodetector system according to claim 1, wherein the control circuit configured to adjust the bias voltage to the common node comprises the control circuit configured to control a voltage supply connected to the common node that sets, via the common node, a first voltage drop over the first photodiode and a second voltage drop over the second photodiode, wherein the first voltage drop induces a first change in the first effective responsivity and the second voltage drop induces a second change in the second effective responsivity.

6. The balanced photodetector system according to claim 5, wherein the first photodiode is coupled between a first supply node and the common node, wherein the second photodiode is coupled between the common node and a second supply node, and wherein the first voltage drop over the first photodiode is between the first supply node and the common node, wherein the second voltage drop over the second photodiode is between the common node and the second supply node.

7. The balanced photodetector system according to claim 1, wherein the control circuit is configured to set the temperature of the balanced photodetector to provide a first temperature at the first photodiode and a second temperature at the second photodiode, wherein the first temperature induces a first change in the first effective responsivity and/or the second temperature induces a second change in the second effective responsivity.

8. The balanced photodetector system according to claim 7, wherein the balanced photodetector comprises a heat source configured to provide heat, and wherein the control circuit is configured to control the heat source to provide heat at the balanced photodetector, such that the first photodiode is at the first temperature and the second photodiode is at the second temperature.

9. The balanced photodetector system according to claim 8, wherein the heat source comprises a first heat source associated with the first photodiode and a second heat source associated with the second photodiode, and wherein the control circuit is configured to control the first heat source to provide heat at the first photodiode such that the first photodiode is at the first temperature and/or wherein the control circuit is configured to control the second heat source to provide heat at the second photodiode such that the second photodiode is at the second temperature.

10. The balanced photodetector system according to claim 1, further comprising:

a transimpedance amplifier coupled with the common node, wherein the transimpedance amplifier is configured to:

receive a first photocurrent associated with the first photodiode and a second photocurrent associated with the second photodiode, and provide a voltage output as a combination of the first photocurrent and the second photocurrent with one another.

11. The balanced photodetector system according to claim 10, wherein one of a non-inverting terminal or an inverting terminal of the transimpedance amplifier is coupled with the common node, wherein the other one of the non-inverting terminal or the inverting terminal of the transimpedance amplifier is coupled with a voltage source.

12. The balanced photodetector system according to claim 1, wherein the control circuit is configured to set the operating parameter of the balanced photodetector to increase a common mode rejection ratio associated with the balanced photodetector.

13. A Light Detection and Ranging (LIDAR) system comprising the balanced photodetector system according to claim 1.

14. The LIDAR system according to claim 13, further comprising:

a light source configured to emit light, and an optical coupler configured to:

receive a portion of the light that the light source emits;

receive light from the field of view of the LIDAR system;

optically couple the light from the field of view and the light that the light source emits with one another to provide output light; and provide a first portion of the output light at the first photodiode and a second portion of the output light at the second photodiode.

15. A balanced photodetector system comprising:

a balanced photodetector comprising a first photodiode having a first effective responsivity and a second photodiode having a second effective responsivity, wherein the first photodiode is coupled to the second photodiode at a common node, wherein the first effective responsivity comprises a first response function describing a first photocurrent that the first photodiode generates in response to incident light, wherein the second effective responsivity comprises a second response function describing a second photocurrent that the second photodiode generates in response to incident light, wherein the first effective responsivity and the second effective responsivity have an initial difference between one another; and a control circuit configured to set an operating parameter of the balanced photodetector to induce a first effective responsivity change in the first effective responsivity and a second effective responsivity change in the second effective responsivity, wherein the operating parameter comprises a bias voltage supplied to the common node or a temperature of the balanced photodetector, wherein:
the control circuit is configured to adjust the bias voltage to the common node based on the initial difference between the first effective responsivity and the second effective responsivity; or
wherein the control circuit is configured to adjust the temperature of the balanced photodetector based on the initial difference between the first effective responsivity and the second effective responsivity,
wherein an operating difference between the first effective responsivity and the second effective responsivity is less than the initial difference.

16. The balanced photodetector system according to claim 15,
wherein the control circuit is configured to set the operating parameter of the balanced photodetector such that the operating difference between the first effective responsivity and the second effective responsivity is substantially zero.

17. The balanced photodetector system according to claim 15,
wherein the operating parameter of the balanced photodetector comprises at least one of a bias voltage and/or a temperature of the balanced photodetector.

18. A method of operating a balanced photodetector, the balanced photodetector comprising a first photodiode and a second photodiode coupled to one another at a common node and in a push-pull configuration, wherein the first photodiode has a first effective responsivity and the second photodiode has a second effective responsivity, wherein the first effective responsivity comprises a first response function describing a first photocurrent that the first photodiode generates in response to incident light, wherein the second effective responsivity comprises a second response function describing a second photocurrent that the second photodiode generates in response to incident light, the method comprising:
setting an operating parameter of the balanced photodetector to compensate for a difference between the first effective responsivity and the second effective responsivity, wherein the operating parameter comprises a bias voltage supplied to the common node or a temperature of the balanced photodetector, wherein:
the setting the operating parameter comprises adjusting the bias voltage to the common node based on the difference between the first effective responsivity and the second effective responsivity; or
the setting the operating parameter comprises adjusting the temperature of the balanced photodetector based on the difference between the first effective responsivity and the second effective responsivity.

* * * * *